United States Patent
Rao et al.

[19]

[11] Patent Number: 5,987,516
[45] Date of Patent: Nov. 16, 1999

[54] METHOD OF GATHERING INFORMATION PERTAINING TO CALLS BETWEEN NODES IN A CONNECTION-ORIENTED NETWORK

[75] Inventors: Anil R. Rao, Sunnyvale; Daniel T. Leary, San Jose, both of Calif.

[73] Assignee: Nortel Networks Corporation, Montreal, Canada

[21] Appl. No.: 08/944,688

[22] Filed: Oct. 7, 1997

[51] Int. Cl.[6] .................................................. G06F 13/00
[52] U.S. Cl. ........................... 709/227; 709/223; 709/249
[58] Field of Search ........................ 395/185.02, 182.04; 707/104; 370/401; 379/93.02; 709/227, 223, 249

[56] References Cited

U.S. PATENT DOCUMENTS

| | | |
|---|---|---|
| 5,333,266 | 7/1994 | Boaz et al. . |
| 5,349,636 | 9/1994 | Irribarren . |
| 5,377,191 | 12/1994 | Farell et al. . |
| 5,530,740 | 6/1996 | Irribarren et al. . |
| 5,530,806 | 6/1996 | Condon et al. ..................... 395/185.02 |
| 5,557,659 | 9/1996 | Hyde-Thomson . |
| 5,583,991 | 12/1996 | Chatwani et al. . |
| 5,586,267 | 12/1996 | Chatwani et al. . |
| 5,598,462 | 1/1997 | Truemner et al. .................... 379/93.02 |
| 5,608,786 | 3/1997 | Gordon . |
| 5,633,916 | 5/1997 | Goldhagen et al. . |
| 5,647,002 | 7/1997 | Brunson . |
| 5,664,107 | 9/1997 | Chatwani et al. . |
| 5,675,507 | 10/1997 | Bobo, II . |
| 5,684,988 | 11/1997 | Pitchaikani et al. ..................... 707/104 |
| 5,737,395 | 4/1998 | Irribarren . |
| 5,740,231 | 4/1998 | Cohn et al. . |
| 5,815,649 | 9/1998 | Utter et al. ......................... 395/182.04 |
| 5,838,682 | 11/1998 | Dekelbaum et al. ................... 370/401 |

*Primary Examiner*—Krisna Lim
*Attorney, Agent, or Firm*—Blakely, Sokoloff, Taylor & Zafman LLP

[57] ABSTRACT

A method of identifying calls between nodes within a connection-oriented network is described. The method commences with the step of identifying first and second network devices within the connection-oriented network. Thereafter, in concurrent first and second operations, network management information is retrieved from the first and second network devices. The management information is processed to identify nodes and calls within the connection-oriented network. Specifically, a group of nodes resident of the first and second network is identified, and a set of calls for which the identified nodes are end-points is determined. In one exemplary embodiment, the management information is processed to identify any other nodes which are end-points of the identified calls. The management information collected in the first and second operations is correlated to determine which of the nodes are in communication with each other via the identified calls.

19 Claims, 16 Drawing Sheets

METHOD OF GATHERING INFORMATION PERTAINING TO CALLS BETWEEN NODES IN A CONNECTION-ORIENTED NETWORK

CROSS-REFERENCES TO RELATED APPLICATIONS

The present application is related to U.S. patent application Ser. No. 08/946,383, entitled A METHOD OF DISPLAYING CHANGES IN CALL STATUS BETWEEN NODES WITHIN A CONNECTION-ORIENTED NETWORK, filed Oct. 7, 1997, and to U.S. patent application Ser. No. 08/946,498, entitled A METHOD OF INCREMENTALLY EXPANDING A DISPLAY OF NODES AND CALLS EXISTING WITHIN A CONNECTION-ORIENTED NETWORK, filed Oct. 7, 1997.

FIELD OF THE INVENTION

The present invention relates generally to the field of computer networking, and specifically to the field of network management in connection-oriented networks. More specifically, this invention relates to the gathering and display of call information relating to calls within an ATM LANE network.

BACKGROUND OF THE INVENTION

The troubleshooting and fault management capabilities of network management software are enhanced by the ability of the software to provide easily discernable and comprehendible information reflecting the current state of the network. To this end, network management software packages may include a graphical user interface (GUI) which provides a visual representation of the network topology, and other management information. As the complexity of computer networks has increased, the capabilities of network management software packages to display information in a user-friendly and useful manner have become strained and inadequate.

Difficulty in representing the state of, and traffic traversing, a network is particularly prominent in connection-oriented networks, such as ATM networks, as a complex arrangement of calls may exist at any particular moment between the various nodes that comprised the network. Particularly in large networks, which may include hundreds or even thousands of routers and switches, the representation of network information in an easily discernible manner can prove difficult. Calls within a connection-oriented network may also be very dynamic and transient in nature, which in itself present numerous monitoring challenges. As ATM networks are increasingly being employed to carry large volumes of critical, high-speed traffic, it has become essential that some effective method be provided for displaying and analyzing the flow of data in the network.

The emergence of hybrid networks, which may support a number of protocols, such as ATM, Ethernet, Token-Ring and FDDI, has also complicated the monitoring and determination of network management information. Specifically, as a number of protocols are implemented in such hybrid networks, tools for representing traffic on such networks are challenged to provide information which allows a network manager easily to locate and identify a network fault. An increasingly common form of hybrid network provides an ATM subnetwork (or backbone) over which a number of "legacy" local area networks (LANs) communicate. One way of operating such a hybrid network utilizes LAN Emulation (LANE) protocols, which can be used to define a number of Emulated LANs (ELANs) within the hybrid network. This form of the hybrid network provides an example of a network that combines both connection-oriented and connectionless protocols.

SUMMARY OF THE INVENTION

According to a first aspect of the invention, there is provided a method of identifying calls between nodes within a connection-oriented network. The method commences with the step of identifying first and second network entities within the connection-oriented network. Thereafter, in concurrent first and second operations, network management information is retrieved from the first and second network entities respectively. The management information is then processed to identify nodes which are resident on the first and second network entities, and to identify calls within the connection-oriented network for which the nodes resident on the first and second network entities are end-points.

In one exemplary embodiment, the network management information is processed to identify further nodes which are not resident on the first or second network entities and which are end-points of the identified calls. The network management information is further correlated to determine which of the identified nodes are in communication with each other via the identified calls.

According to a second aspect of the invention there is provided a computer-readable medium having a sequence of instructions stored thereon which, when executed by a processor, cause the processor to perform the steps set out in the first aspect of the invention.

According to a third aspect of the invention there is provided a carrier-wave encoding a sequence of instructions which, when executed by a processor, cause the processor to perform the steps set out in the first aspect of the invention.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of gathering information pertaining to calls between nodes in a connection-oriented network is described. In the following description, for the purposes of explanation, numerous specific details are set forth in order to provide a thorough understanding of the present invention. It will be evident, however, to one skilled in the art that the present invention may be practiced without these specific details.

For the purposes of this specification, the term "network device" shall be taken to mean any physical device included within a network including, but not limited to, a switch, router, hub, exchange, bridge, workstation or terminal. The term "node" shall be taken to mean any network entity, implemented in hardware or software, which may be the end-point of a call within a connection-oriented network and shall include, but not be limited to, LANE entities implemented to support LAN Emulation (LANE) within an ATM network. The term "call" shall be taken to mean any communication path that is established between at least two nodes for the purpose of communication therebetween.

An exemplary embodiment of the present intention is described with reference to an Asynchronous Transfer Mode (ATM) network implementing LANE protocols. Those skilled in the art will appreciated that an ATM network is only one example of a connection-oriented network, and that the present invention could similarly be implemented, for example, in a Frame Relay, X.25, POTS (Plain Old Telephone Service) network or any other connection-oriented network.

Exemplary Network

Figure 1:
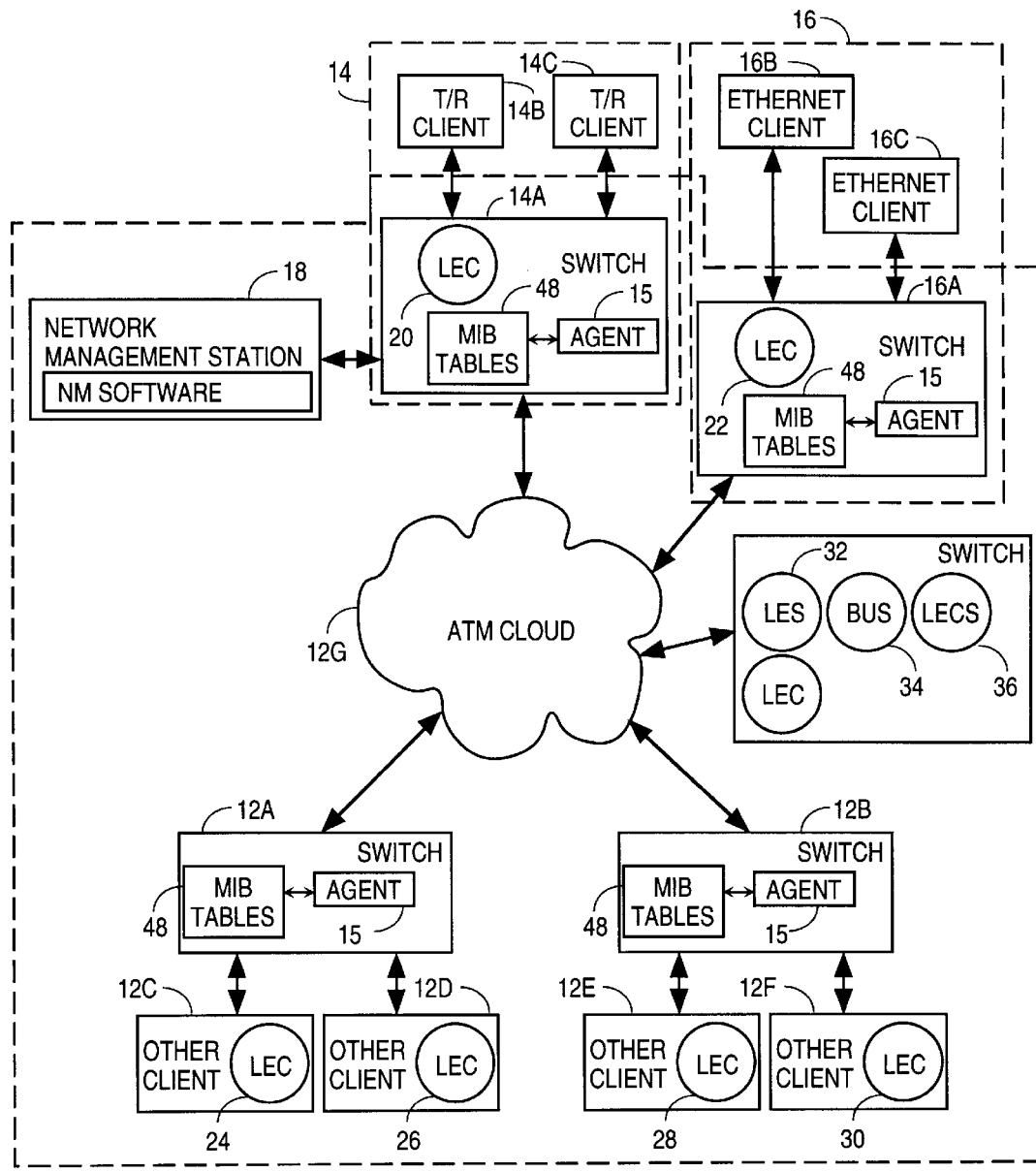
FIG. 1 is a diagrammatic representation of a connection-oriented network within which the present invention may be implemented.

Referring to FIG. 1, there is provided an example of a hybrid network 10 implementing LANE protocols, and comprising an ATM backbone or network 12 to which are coupled two "legacy" networks, namely a Token Ring network 14 and an Ethernet network 16. Communication over the ATM network 12 is performed using fixed-length ATM cells that establish and traverse virtual connections (also referred to as virtual circuits) between origin and destination entities. The origin and destination entities, for the purposes of this specification, may be termed the "endpoints" of the virtual connection. LANE protocols define entities within the network 10, hereinafter referred to as nodes, which may function as end-points of calls, as is described in further detail below. A virtual connection may be either a Permanent Virtual Connection (PVC) or a Switched Virtual Connection (SVC). Each ATM cell includes a header identifying a destination entity, a cell type and priority. Specifically, each cell header includes (1) a Virtual Path Identifier (VPI) and Virtual Circuit Identifier (VCI) which together identify Virtual Channel Connection (VCC), or (2) only a Virtual Path Identifier (VPI) which identifies a Virtual Path Connection (VPC). Accordingly each VPI and VCI pairing identifies a unique Transmission Path (TP) through the ATM network, each TP comprising a Virtual Path Connection (VPC) and optionally at least one Virtual Channel Connection (VCC). The pairing of a VPI and a VCI (termed the VPI/VCI address), and a physical switch port address, identify the end-points of a VCC within an ATM network. Referring specifically to the exemplary ATM network 12 shown in FIG. 1, the network 12 includes ATM switches 12a and 12b, ATM clients 12c–12f, and an ATM cloud 12g. The ATM cloud 12g may comprise any combination or permutation of ATM network devices, including switches and routers. While, for example, a call between ATM clients 12c and 12f may traverse many switches in the ATM cloud 12g, as well as switches 12a and 12b, such a call may conceptually be viewed as a "direct" virtual or logical connection between the clients 12c and 12f.

The exemplary ATM network 12 is also shown to include a network management station 18 that executes network management software 40. The management software 40, in one exemplary embodiment, implements the Simple Network Management Protocol (SNMP), and accordingly gathers network management information captured by Network Management Agents ("agents") 15 resident on network devices throughout the ATM network 12. Each agent 15 is responsible for the maintenance of local Management Information Base (MIB) tables 48, which are data structure accessible via SNMP and which store network management information as ascertained by the relevant agent. Accordingly, each of the switches 12a, 12b, 14a and 16a is shown to be associated with an agent 15 which establishes and maintains the local MIB tables 48.

LANE Overview

Referring now to the "legacy" Token-Ring and Ethernet LANs 14 and 16, it will be appreciated that the connectionless protocols under which these LANs operate are fundamentally different from the connection-oriented nature of the ATM protocol. Specifically, in an ATM network a VC has to be setup from the origin to the destination before data transmission, while in Ethernet or Token-Ring networks, no such setup is required. For a client of the Token-Ring LAN 14 to communicate with another client in the network 10 outside the LAN 14, message packets are forwarded the switch 14a, which then fragments and encapsulates the packets as a series of ATM cells for transmission over the ATM network 12. A LANE agent, known as a LAN Emulation Client (LEC) 20, is hosted on the switch 14a and defines the interface between the legacy LAN 14 and the ATM network 12. Specifically, the LEC 20 is responsible for mapping the Media Access Control (MAC) addresses of stations within the Token-Ring network 14 to ATM addresses. The LEC 20 has a unique ATM address, participates directly in the ATM network, and can accordingly create and destroy VCs as needed to make connections to other ATM devices. One of the primary functions of the LEC 20 is to find an ATM address that corresponds to the destination MAC address of any packet it sends. A LEC 22 is also hosted on the switch 16*a* of the Ethernet network 16, and similarly provides an interface between the Ethernet LAN 16 and the ATM network 12. From a LANE perspective, each of the LANs 14 and 16 may be defined as an emulated LAN (ELAN).

The hybrid network 10 also includes a LAN Emulation Server (LES) 32, which is shown to reside on a switch 31. The LES 32 manages the LECs 20–30. The LES 32 maintains a transient connection to every LEC in the ELAN which is defined within network 10. At this point, it is useful to point out that two forms of connections may be utilized within LANE, namely control connections and data connections. An example of a control connection is a Control Direct VCC, which each LEC uses to send a LANE address resolution request to the LES 32. An example of a data connection is a Data Direct VCC, which has the primary purpose of carrying data transmitted between source/destination ATM address pairs (i.e. between end-points of a call). Data connections are typically more transient than control connections.

LAN protocols, such as Ethernet and Token-Ring, each include a shared media and provide broadcast mechanisms that allow members of the LAN to send a broadcast packet to every other device that is a member of the respective LAN. As ATM has no shared media, protocols must be defined to provide a broadcast capability. The LANE protocol provides this capability utilizing a Broadcast and Unknown Server (BUS) 34. The BUS 34 maintains a point-to-multipoint VC to all LECs within a particular ELAN. Accordingly, to achieve a point-to-multipoint communication within an ELAN, ATM cells corresponding to the original broadcast message are forwarded to the BUS 34, which then duplicates these cells and sends a copy to every LEC which is a member of the respective ELAN.

A further emulation server defined by the LANE protocol is the LAN Emulation Configuration Server (LECS) 36. Within a particular ATM network, more than one emulated LAN (ELAN) may exist, and it is possible to configure a network device to participate in more than one ELAN. It is the purpose of the LECS 36 to keep track of the various ELANs within an ATM network. For example, for each ELAN defined within the network 10, a dedicated LES and BUS pairing for each ELAN is created. The LECS 36 would then track each of the ELANs defined in the network 10, and provide a LEC with the address of the LES/BUS pairing for the ELAN which the LEC wishes to join.

It will be appreciated that a complex and dynamic set of calls may exist at any given moment within a network 10. For example, a number of control connections may exist between the LECs 20–30 and the LES 32 for the purposes of establishing data connections between respective LECs. Furthermore, each LEC maintains a data connection to a BUS 34. Various other control connections are established from time to time between the above-described nodes. It will of course be appreciated by those skilled in the art that the teachings of the present invention are not limited to an ATM network embodying ELANs and implementing LANE protocols, and could similarly be applied to any form of ATM network or other connection-oriented network. The present invention is described with reference to an ATM network implementing LANE protocols, and the various LANE entities described above provide one example of nodes which may exist within a connection-oriented network.

Software Overview

Figure 2:
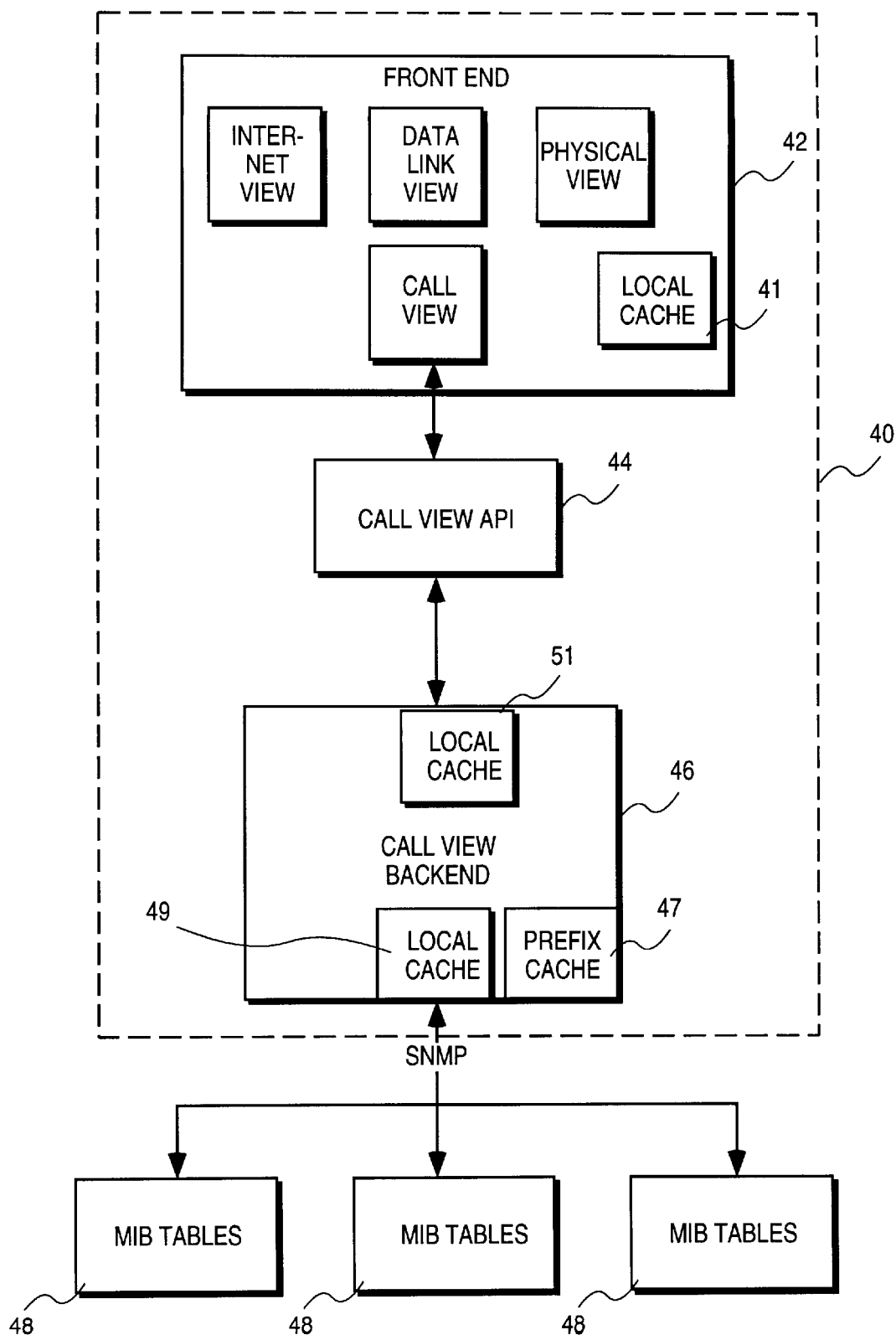
FIG. 2 is a diagrammatic representation of network management software modules that implement an exemplary embodiment of the present invention.

Referring to FIG. 2, there is illustrated an exemplary embodiment of the network management software 40 which may implement the teachings of the present invention, to thereby provide a user with a graphical representation of call traffic within a connection-oriented network. In one embodiment, the network management software 40 resides on a network management station, which includes a display device (such as a Cathode Ray Tube (CRT)) on which graphical data representing call information can be displayed.

The network management software 40 comprises three primary modules, namely a front-end 42, an Application Program Interface (API) 44 and a back-end 46. The front-end 42 generates a Graphical User Interface (GUI) that provides various views of devices and/or nodes and/or connections within the network 10, and also facilitates various forms of user input. In the exemplary embodiment, the front-end 42 is capable of providing four views of a network, namely an Internet view, a Data Link view, a Physical View and a Call View, each of which provide different information concerning the network. The present invention is explained below with reference to the Call View that provides a graphical representation of selected nodes and calls (for which the selected nodes represent end-points) within a network. In one exemplary embodiment, the front-end 42 comprises the Network Atlas included in the Optivity Lan™ product developed by Bay Networks of Santa Clara, Calif. For the purposes of generating the Call View display, the front-end 42 communicates with the back-end 46 via the Call View API 44.

The front-end 42 performs, inter alia, the following functions:

1. Displaying buttons to select one of the views discussed above;
2. Defining icons, objects and links representing nodes and calls within a network;
3. Layout determination; and
4. Data collection progress indicating.

The front-end 42 also maintains a local cache 41 of information regarding nodes and calls, this local cache 41 being utilized for generating the Call View display. All node and call information within the local cache 41 need not all be displayed, but can be displayed by the front-end 42 without performing a callback to the back-end 46.

Having the back-end 46 distinct from the front-end 42 is advantageous in that these two modules can be interchanged with other modules that provide similar functionality. Accordingly, were a future and updated front-end to be developed, this could operate seamlessly with the existing back-end 46. The back-end 46 is coded in such a way so as to allow it to be distributed, and connected to the front-end 42 in various ways. The back-end 46 is furthermore capable of functioning as a stand-alone server, a callback-oriented library or a socket communication server as necessary. The back-end 46 embodies functionality that is responsive to user inputs from the front-end 42. The back-end 46, as illustrated, communicates using SNMP with MIB tables 48 stored on various devices distributed throughout a network. In summary, the back-end 46 performs at least the following functions:

1. Initialization of the Call View API and of other APIs;
2. Sending data collection status messages to the front-end 42;
3. Adding further nodes to the "scope" of Call View (as will be described below); and
4. Providing the front-end 42 with a consolidated list of nodes and calls for display.

The back-end 46 also maintains a prefix cache 47, a MIB data local cache 49 and a consolidated data local cache 51. The prefix cache 47 maps prefixes of ATM addresses to IP addresses, so as to allow the back-end 46 to identify agents on network devices which should be addressed to obtain the MIB information required to comply with a front-end 42 request. The MIB data local cache 49 stores data as collected from the MIB tables 48, and the cache 51 caches a consolidated list of nodes and calls prior to this list being sent to the front-end 42.

MIB Information Gathering

As described above, the nature of VCCs (and particularly control connections) between nodes in a network may be very transient in nature. For this reason the capture of information representative of calls existing in an ATM network at any specific moment is particularly difficult. Specifically, when network management software is busy obtaining information regarding a particular call, it is probable that information previously collected regarding other calls has in the meantime become outdated and incorrect. Accordingly, the present invention proposes a method by which information representative of calls within a network can be gathered in a manner which provides a more accurate snapshot of calls existing at a given moment within a network.

Figure 3:
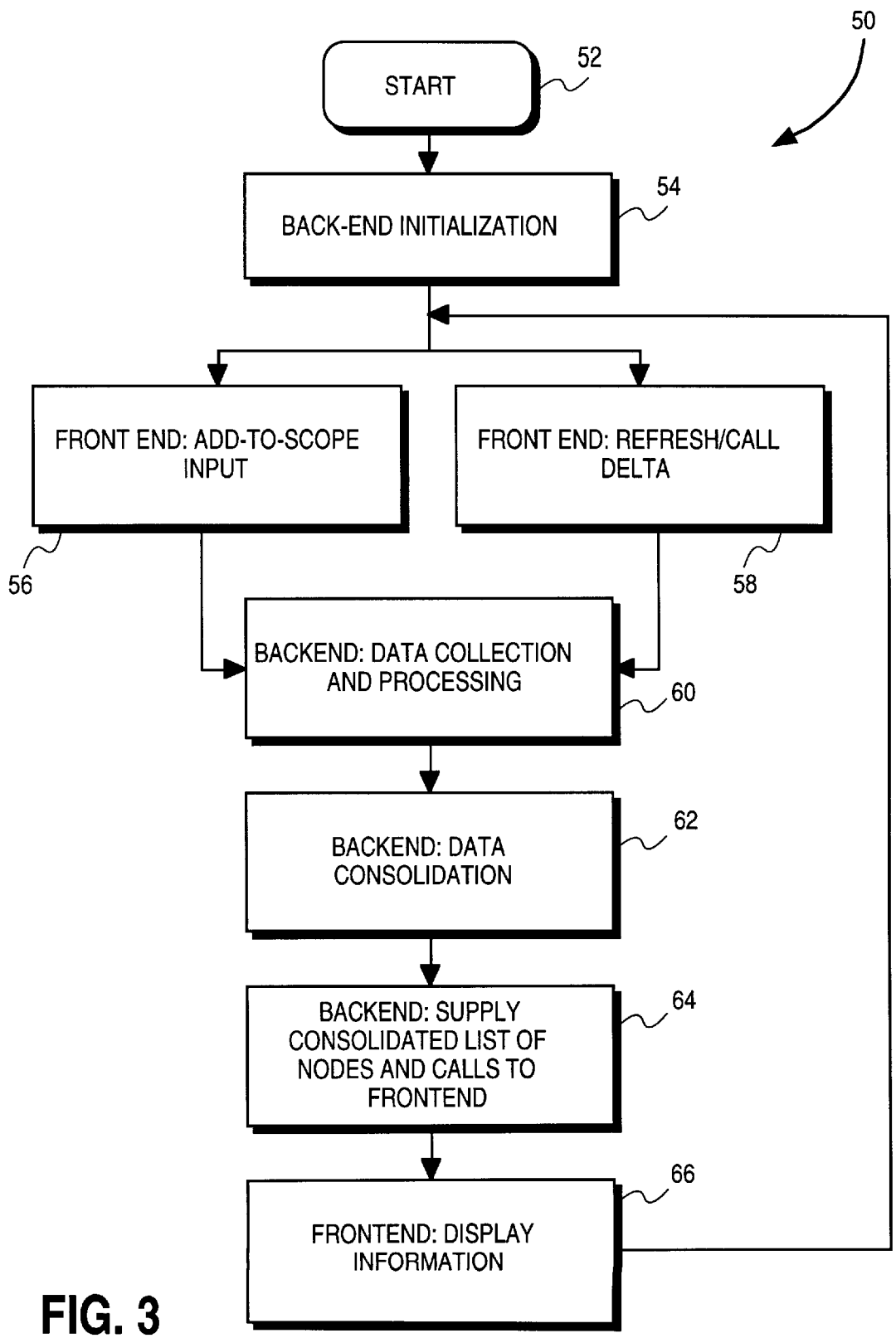
FIG. 3 is a flowchart illustrating a method, according to one embodiment of the present invention, of identifying calls between nodes in a connection-oriented network.

FIG. 3 is a high-level flowchart illustrating a method 50, according to one embodiment of the present invention, of gathering call information within a network for display by network management software. The method 50 commences at the step 52, and then proceeds to step 54, where the back-end 46 is initialized by the front-end 42. During the initialization step 54, the front-end 42 initializes the back-end 46 with information about the network devices, such as switches, known at that time to the front-end 42. The back-end 46 will talk to all network devices, and obtain information regarding ATM address prefixes for each of these devices. Specifically, each ATM entity (e.g. LANE node) within the network 10 has an ATM address including a prefix, the prefix being particular to the network device (e.g. switch) on which the ATM entity resides. Accordingly, if multiple LANE nodes reside on a single switch, such multiple LANE nodes will each have an ATM address with a common prefix. By interrogating network devices, each of which has an IP address, to learn the ATM address prefixes of nodes resident thereon, the back-end 46 is able to establish the prefix cache 47 which maps IP addresses to ATM address prefixes. This is useful for allowing the back-end 46 to determine which network device to address using the device's IP address if the ATM address prefix of any node residing thereon is known. The front-end 42 will also provide the back-end 46 with information about callback functions that may be utilized by the back-end 46 to communicate with the front-end 42.

At step 56 the user may initiate an "add-to-scope" operation, for example by performing a transform from the Physical View to the Call View, or by performing a "drag-and-drop", as will become apparent below. In transforming from a Physical View to a Call View, a user (in the Physical View) selects a network device or group of network devices, for which information regarding LANE nodes and calls are to be displayed. In the "add-to-scope" operation, nodes are added to the "scope" of the Call View display. In the embodiment of the present invention illustrated in FIG. 2, the "scope" is defined as the nodes that the network management software displays in the Call View display screen. To this end, the front-end 42 maintains the local cache 41 of information indicating the nodes that are currently with the scope of the Call View display screen, as well as nodes which are just outside the scope. The manner by which nodes are added to the scope of the Call View is described below. At step 58, a user also has the option of performing a "refresh" or a "call delta" operation. The "refresh" operation is selected to refresh call information for all nodes that are already defined as being within the scope of the Call View display. The "call delta" operation is selected to the view information regarding changes in call status between the nodes within the scope of the Call View display.

The nature of the operation having been defined at either step 56 or step 58, the method 50 then proceeds to step 60, where data collection and processing operations are performed by the back-end 46. Specifically, at step up 60, the back-end 46 will perform a SNMP operation each time new data is to be obtained from the network. To perform the data collection, the back-end 46 employs a parallel discovery process. In this process, the back-end 46 generates dedicated MIB engine instances to obtain MIB information from each network device. The term "instance" shall be interpreted non-restrictively, and taken to be synonymous with the terms "thread" or "process". The back-end 46 reads a set of MIB tables 15 maintained by each network device's network management agent 15, and creates a number of internal data structures. At the end of each of the parallel discovery processes (i.e. after each MIB engine instance has completed its respective data collection), the back-end 46 sends a status message to the front-end 42, to thereby enable the front-end 42 to display the progress of the parallel discovery process. Each of the discovery processes is asynchronous.

Figure 4:
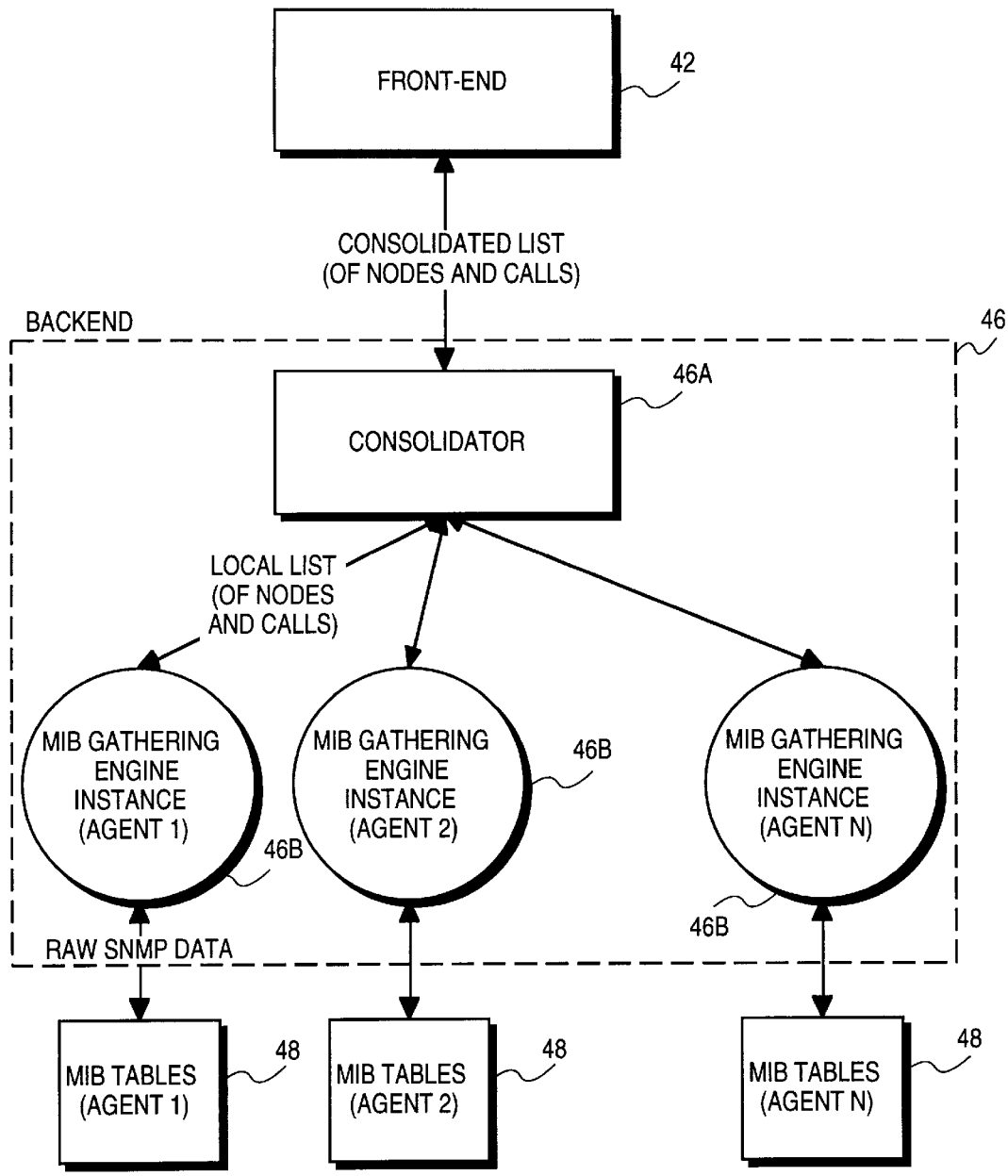
FIG. 4 is a diagrammatic representation of the components that comprise a back-end module of the network management software shown in FIG. 2.

Reference is now made to FIG. 4, which provides a more detailed view of the back-end 46. Specifically, the back-end 46 is shown to comprise a consolidator 46a, which communicates with each of a plurality of MIB gathering instance engines 46b. The purpose of the consolidator 46a is essentially to determine which nodes have calls established between them (i.e., which nodes are "talking" to each other). As illustrated, a dedicated MIB gathering engine instance 46b is generated to read a MIB table 48, utilizing an agent 15 on each network device. The parallel discovery process is particularly advantageous in that, by obtaining MIB information utilizing concurrent operations, a snapshot of MIB information extant within a very short period of time can be obtained. Utilizing this snapshot of MIB information, the network management software 40 can generate an accurate representation of the call information pertaining to the network over this very short period of time.

Referring again to FIG. 3, having performed the data collection and processing operations at step 60, the method 50 proceeds to step 62, at which a data consolidation operation is performed. Each of the MIB gathering engine instances 46b provides a local list of nodes and calls, for the associated agent, to back-end 46. Utilizing the local list of nodes and calls from each of engine instances 46b, the consolidator 46a generates a consolidated list of nodes and calls, which is then forwarded to the front-end 42 at step 64. The consolidated list includes information about nodes within the scope, and also about nodes that are just outside the scope (i.e. nodes that are not resident in the selected switches (or network devices), but which have calls to nodes in the selected switches). The consolidated list contains sufficient information for the front-end 42 to determine whether a node included in the consolidated list is within the scope of the Call View display or not. In the exemplary embodiment, the consolidated list includes the following information concerning each node (i.e. LANE agent of the exemplary embodiment):

- a node identifier;
- a node name;
- a node label;
- a node type (e.g., unknown, internal LEC, external LEC, PVC End-Point, LES, LECS or BUS);
- information concerning the network device on which the node is resident;
- information concerning which ELAN(s) the node belongs to;
- a virtual port identifier;
- a bridge group identifier;
- a health indicator; and
- a group identifier, which will be the same for nodes residing on a common switch and is useful in grouping nodes.

Figure 8A:
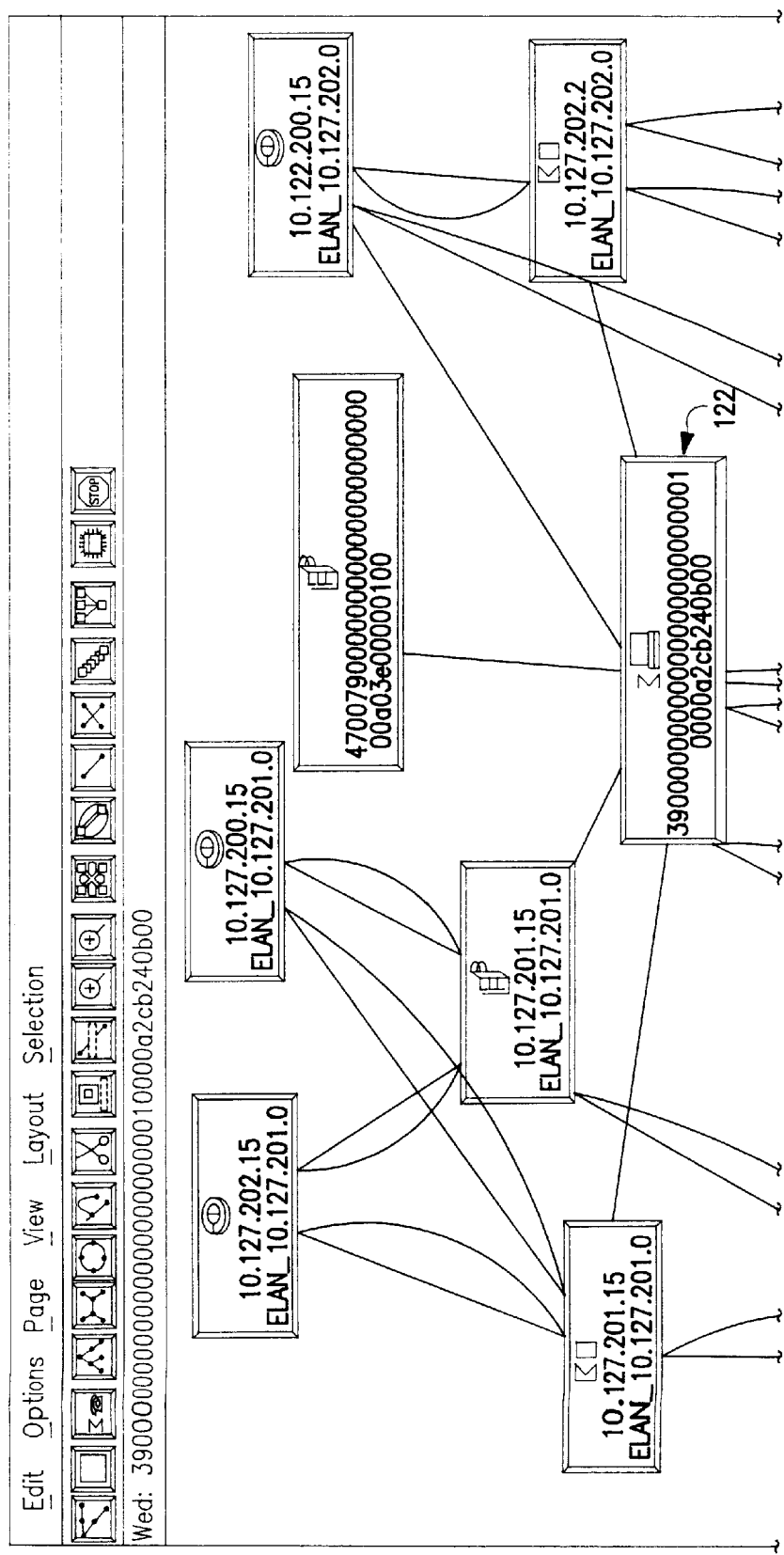
FIG. 8 shows an exemplary Call View, according to one embodiment of the present invention, which may be generated on a display unit by the network management software illustrated in FIG. 2.
Figure 8B:
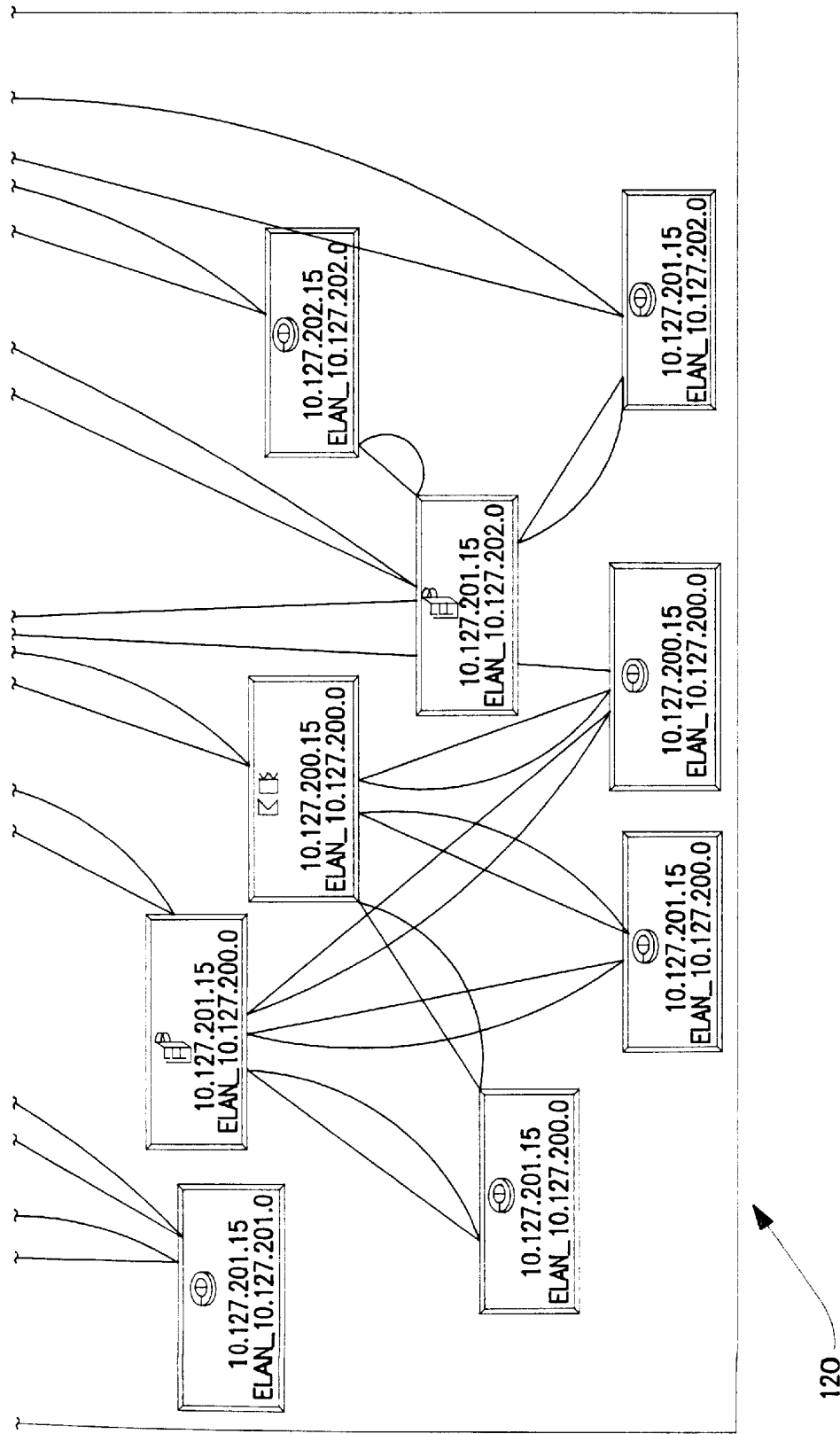

In the exemplary embodiment, the consolidated list includes the following information about each call (e.g. VCC) for which a node, resident on a selected switch, is an end-point:

- a call name;
- a source node name;
- a target node name;
- a call type (e.g., point-to-point, point-to-multipoint, VP, VC, Switched, Permanent, Control Connection, Data Connection);
- a call delta type (as described in further detail below);
- a source label; and
- a target label At step 66, the front-end 42 displays graphical representations of both nodes and calls according to the consolidated list of nodes and calls supplied to it from the back-end 46. An example of the display generated by the front-end 42 is shown in FIG. 8. Utilizing the information included in the consolidated list regarding nodes and calls, the front-end 4 is optionally able to filter out nodes or calls according to predefined criteria prior to display within the Call View display screen.

Figure 5:
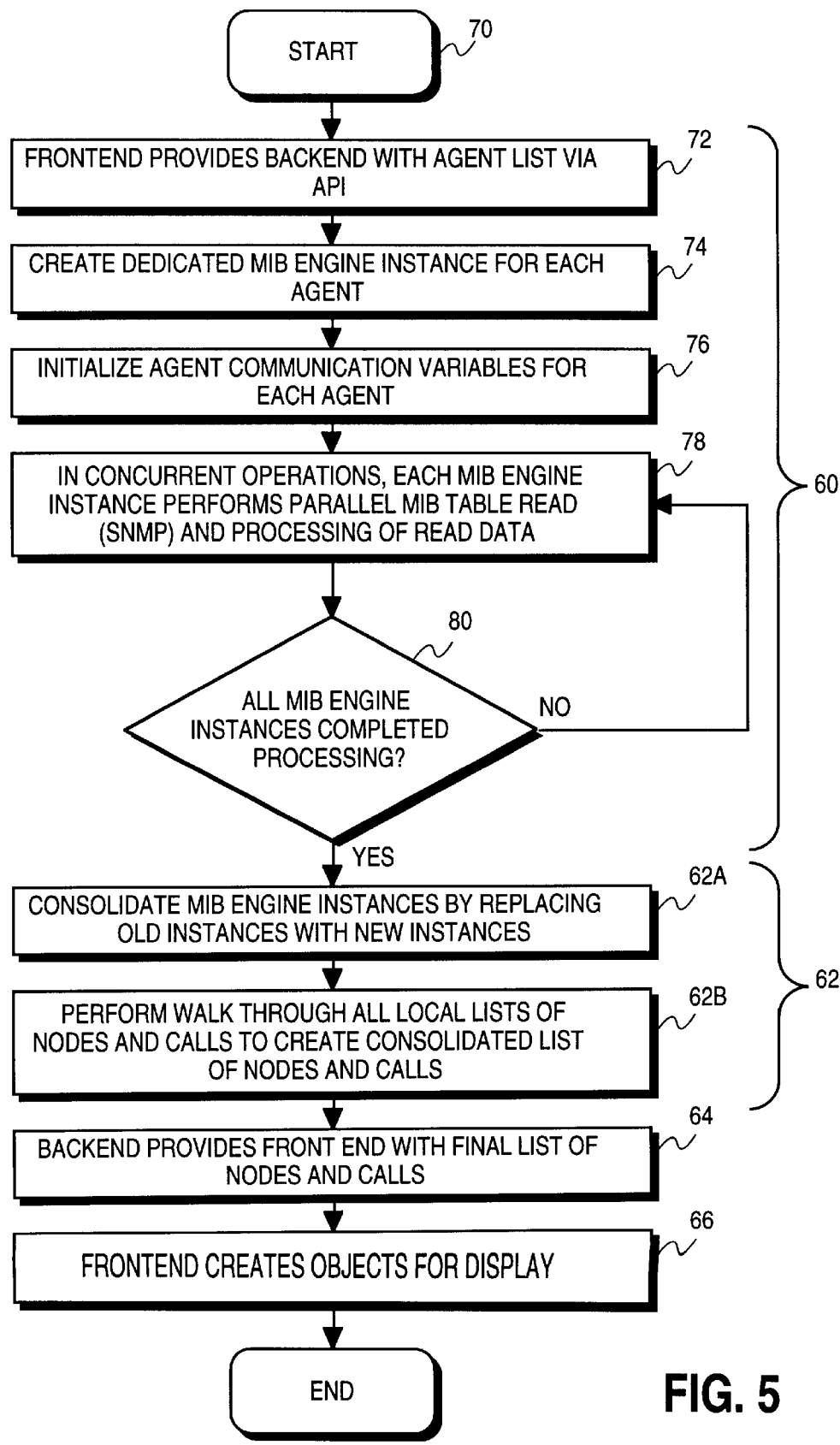
FIG. 5 is a flowchart illustrating in more detail the steps comprising the method illustrated in FIG. 3.
Figure 6:
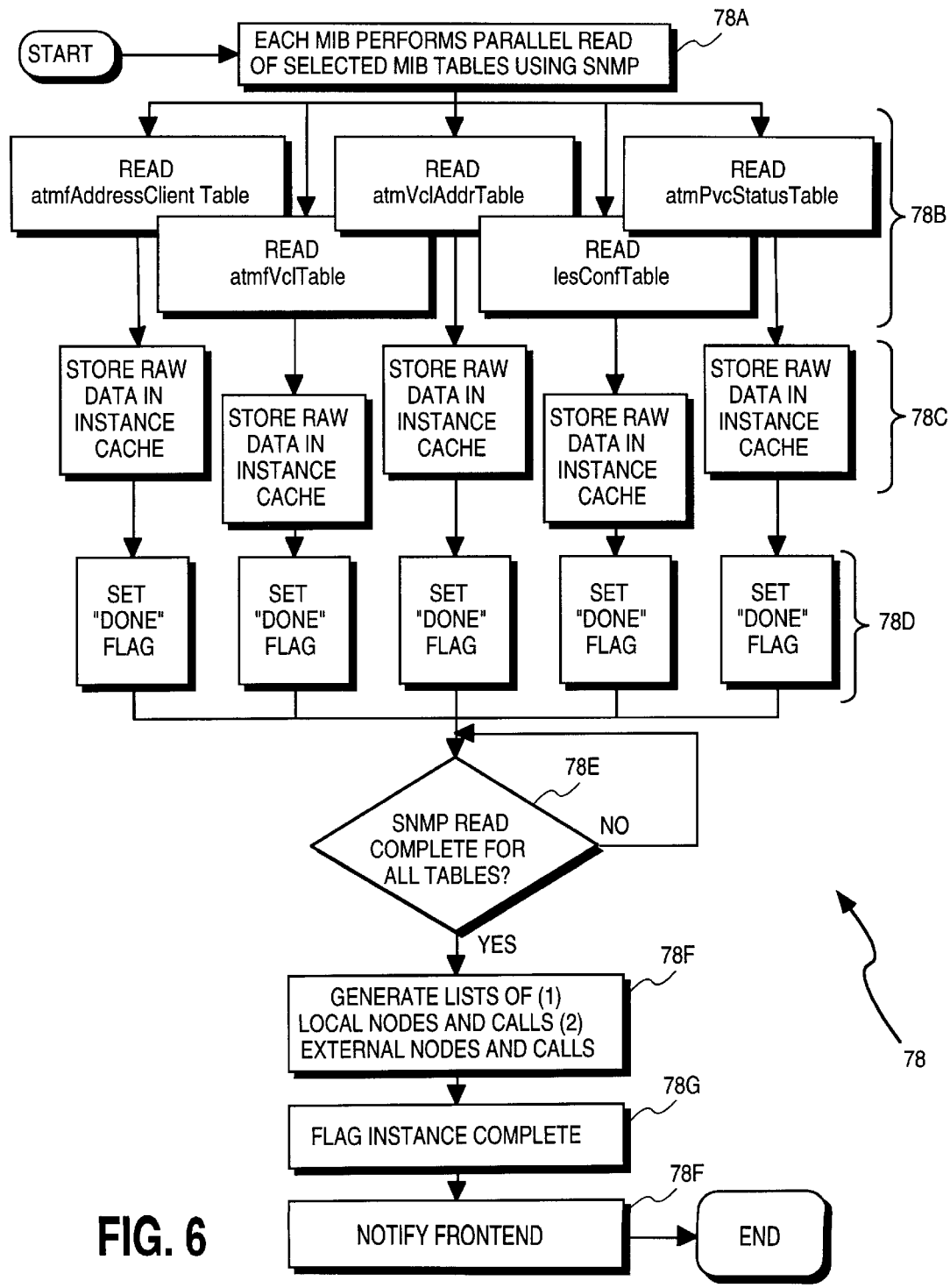
FIG. 6 is a flowchart illustrating the steps, according to one embodiment of the present invention, which comprises a parallel MIB gathering operation shown in FIG. 5.

FIGS. 5 and 6 are flowcharts showing in greater detail the steps involved in the data collection and processing operations 60 and the data consolidation operation 62. As shown in FIG. 5, the data collection operation 60 commences at step 70, whereafter the front-end 42 provides the back-end 46 with a network device list (e.g. the selected switches) via the API 44. At step 74, the back-end 46 then creates dedicated MIB engine instances 46b for each of the selected network devices reside. At step 76, agent communication variables for each of the agents 15 on the selected network devices are initialized.

At step 78, in concurrent operations, each of the MIB engine instances 46b performs a parallel MIB table read operation utilizing the agents 15 and the SNMP protocol. Having performed the parallel read operations, each MIB engine instance 46b then processes the raw data to generate a local list of nodes and calls for the respective network device. Specifically, the back-end 46 generates a list of (1) nodes resident on the selected network device, and (2) calls for which the nodes are end-points. At step 80, a determination is made as to whether all MIB engine instances have completed processing of the raw data.

During the data consolidation operation at step 62, the back-end 46 performs a data consolidation with respect to the local lists of nodes and calls supplied to it from the various MIB engine instances 46b. It will be recalled that the local lists each identify nodes and calls local to a particular network device. At step 62, the consolidator 46a consolidates the various local lists by replacing "old" data with "new" data (i.e. data most recently collected). At step 62b, the consolidator 46a performs a walk through of all the local lists, and identifies duplicate call information in these local lists, which indicates that known nodes exist at both ends of a call. As nodes of a duplicate call are each resident on a selected network device, the front-end 42 will have a full record of the nature and characteristics of these nodes. Accordingly, the front-end 42 can, in the Call View display, draw an appropriate icon representative of the device type, and other information pertaining to the node. On the other hand, should only one record for a call be presented to the consolidator 46a from the various MIB gathering engine instances 46b, this indicates that the relevant node is not resident on a selected network device. In this case, the consolidator 46b will represent such a node in the consolidated list of nodes and calls as an "unknown" node. Upon receipt of the consolidated list, the front-end 42 identifies such a node as requiring validation based on its type being "unknown". In one exemplary embodiment, the front-end 42 will then issue a call back message to the back-end 46 requesting further information (e.g. node type information) concerning such an unknown node. In another embodiment, the front-end 42 will merely display such a node as having unknown characteristics. In summary, the consolidator functions to consolidate and correlate the local lists of nodes and cells to determine which nodes in the selected network device (e.g. switches) are in communication with each other.

The present invention also proposes allowing a user to terminate a MIB gathering operation for any reason. For example, the user may indicate via the front-end 42 that the MIB gathering process is to terminate as it is taking too long and he/she wishes to reduce the number of selected network devices. In this case, the front-end 42 will communicate a terminate call to the back-end 46. The back-end 46 will then determine what portion of the MIB gathering process has been completed. As the data collection operation by the individual instance engines 46b is a far longer process than the data consolidation operation, the back-end 46 will terminate the method 60 if the data collection operation is not complete. However, should the data consolidation operation, which can be completed quickly, have commenced, the back-end 46 will ignore the terminate call from the front-end 42.

Figure 7:
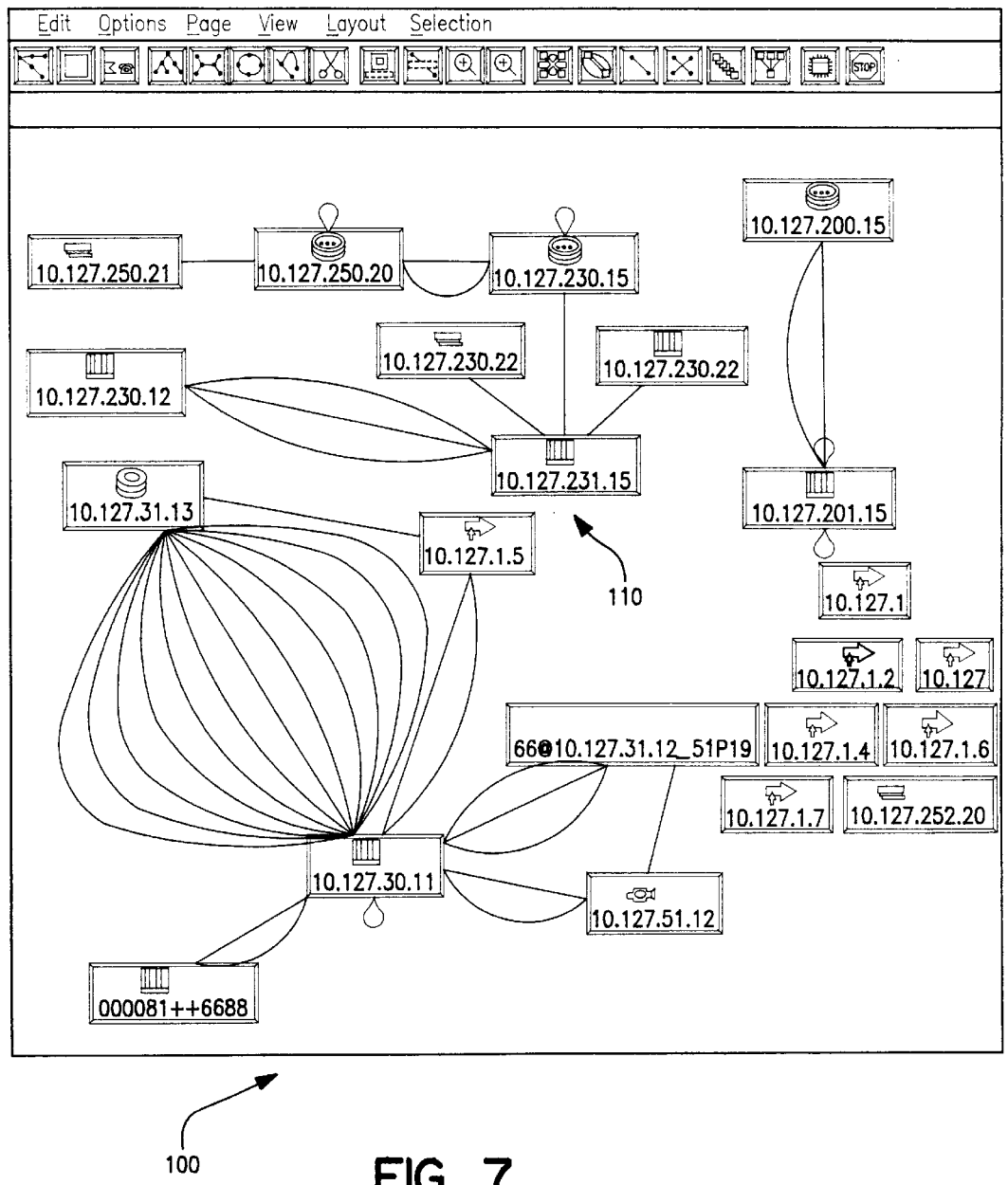
FIG. 7 shows an exemplary Physical View that may be generated on a display unit by the network management software illustrated in FIG. 2.

FIG. 6 is a flowchart providing an exploded view of the steps performed by each MIB engine instance 46b during step 78. At substeps 78a and 78b, a MIB instance engine 46b performs a parallel read of selected MIB tables using the SNMP to obtain "raw data" or information concerning (1) LANE entities (nodes) that are within the scope of the Call View display (i.e. resident on selected network devices), and (2) any calls (i.e., in the exemplary embodiment, VCs) for which such nodes are end-points. It should be noted that each of the MIB tables is read in parallel by each of the MIB engine instances 46b, which are in turn operating in parallel with each other. Only a few examples of MIB tables 48 which are read are illustrated in FIG. 7. An exemplary list of MIB tables 48 which may be read in parallel by each MIB engine instance is provided below:

atmfAddressClient Table
    atmVclTable
    atmSvcVcCrossConnectTable
    atmVclAddrTable
    atmVcCrossConnectTable
    atmAddrVclTable
    cnLaneNetPrefixTable
    cnIfExtnTable
    sysObjectID
    s5AgOthIfTable
    lecStatusTable
    elanConfTable
    elanLesTable
    lesConfTable
    lesStatTable
    lesBusTable
    atmPvcStatusTable
    lecServerVccTable
    cnLesBusPeerTable In the exemplary embodiment, a LANE entity (i.e. node) is identified by an address including a prefix, which can be mapped to an IP address. The IP address is the address of the agent that is used to read the MIB tables 48 from each of the network devices. The ATM address of a node can be obtained by reading the "ifIndex", VPI and VCI fields in the atmVclTable, and matching these entries with at least two entries in the atmVclAddrTable. In this way, the ATM addresses of both originating and terminating nodes of a call can be determined.

The raw data retrieved from each of the MIB tables 48 is then stored in an instance cache 49 at substep 78c, and a "DONE" flag is set for each of the MIB tables at step 78d. At substep 78e, a determination is made as to whether the respective MIB engine instance 46b has completed a SNMP read for each of the required MIB tables. If so, a local list is generated for the respective network device at substep 78f. Specifically, the local list comprises (1) a list of nodes hosted by the selected network device, and (2) a list of calls for which these nodes are end-points. Having generated the local list, the MIB engine instance 46b is flagged as "DONE" at substep 78g, whereafter the front-end 42 is notified of this event at step 78f, so as to provide an indication of the progress of the various MIB engines.

The above-described method of parallel data collection by MIB engine instances 46b is advantageous in that it allows for the expeditious and concurrent retrieval of information from a number of locations thereby to provide an accurate snapshot of a transient condition. Further, the method is advantageous in that data is collected in real-time, and only for selected switches. The data collection is furthermore performed in response to user input, and it is thus not necessary to maintain any central database of information, which must be continually updated and which quickly becomes obsolete.

Selective and Incremental Display of Call Information

Figure 9A:
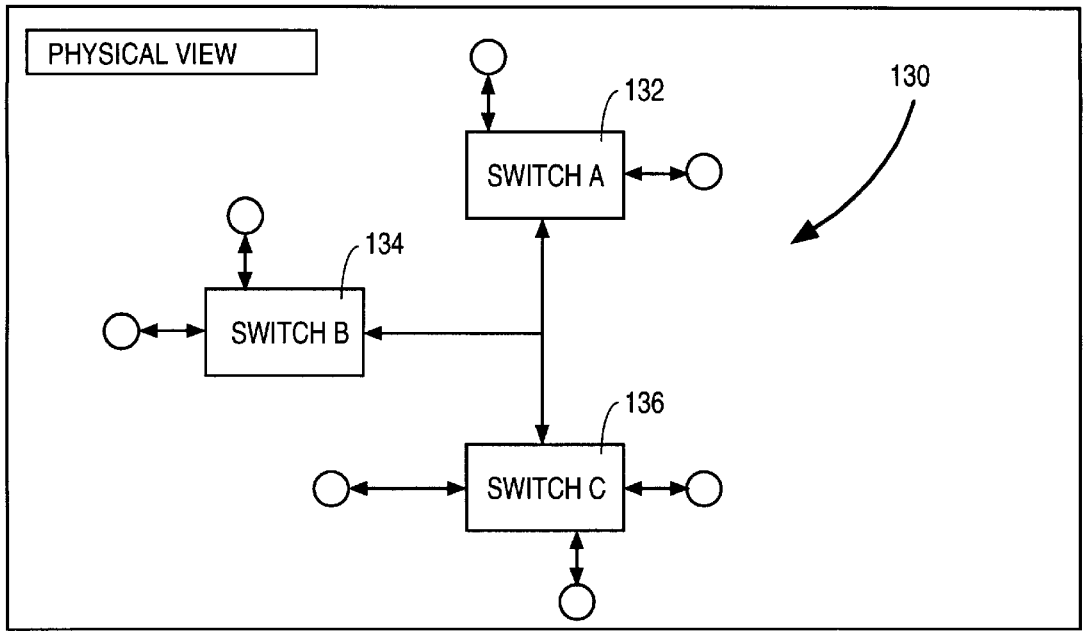
FIGS. 9a and 9b are simplified representations of Physical and Call Views, illustrating the transformation of the former into the latter according to one embodiment of the present invention.
Figure 9B:
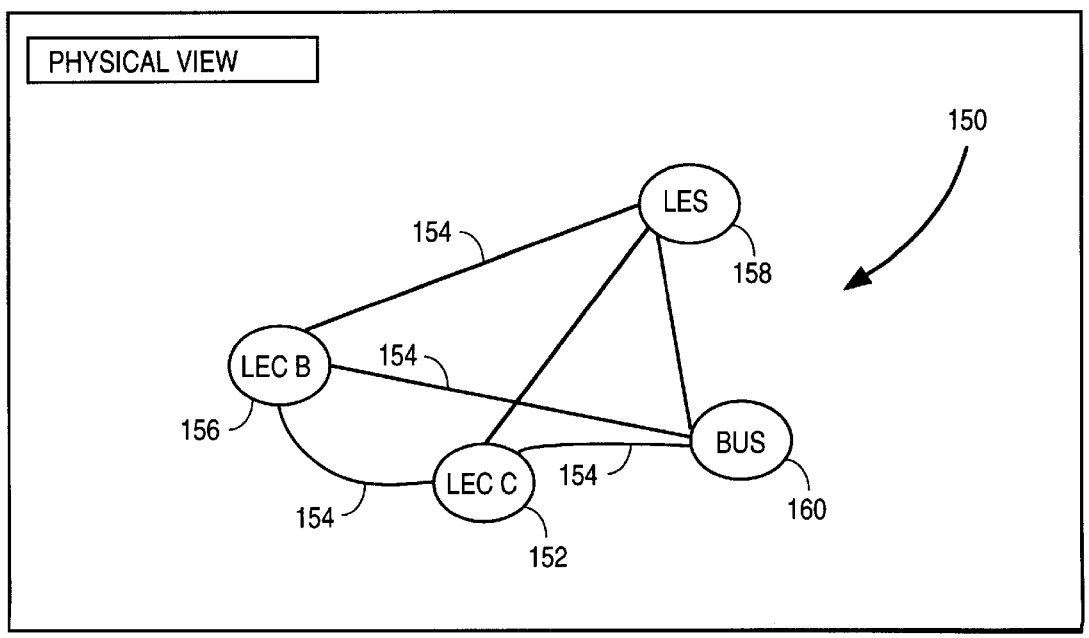

As described above with reference to FIG. 2, the front-end 42 is able to generate Internet, Data Link, Physical and Call Views of a connection-oriented network, such as the network 10. FIG. 7 provides an example of a Physical View 100 that may be generated by the front-end 42, this Physical View 100 displaying icons representative of physical devices (e.g. routers, bridges, switches, hubs, end stations) within an exemplary network. Specifically, each icon in the Physical View 100 includes a symbol representative of the device type, and an Internet Protocol (IP) address of that device's agent 15. The topology of the physical network may be discovered according to the teachings of U.S. Pat. No. 5,586,267, which is assigned to the present applicant. While this view is useful for certain purposes, it does not to provide adequate data concerning calls between nodes. Accordingly the present invention proposes that, by a selecting a network device or group of network devices, shown in the Physical View 100, a user can transform the Physical View 100 into a Call View 120, such as that shown in FIG. 8. For example, selecting the network device 110 in the view 100, and then dragging this icon onto a Call View will generate the Call View 120 in FIG. 8. In the exemplary Call View 120, the icon 122 represents a node hosted on the network device 110, and the lines shown fanning out from the icon 122 represent calls for which the relevant node is an end-point. An icon similarly represents each of the other nodes in the network that have established calls with the subject node. Each icon may present certain information concerning a respective node, and each icon is shown to include a symbol representative of the node type, as well as an IP address for the node. A name on the icon also provides information identifying an Emulated LAN (ELAN) in which the respective node participates. FIGS. 9a and 9b illustrate simplified examples of Physical and Call Views respectively. Referring specifically to FIG. 9a, there is shown a Physical View 130 of a network including three switches 132, 134, and 136. Selecting the switch 136 on which a LANE node in the form of a LEC 152 is resident generates the Call View 150 shown in FIG. 9b. Accordingly, utilizing the parallel information gathering methodology described above, the software 40 gathers information pertaining to calls 154 for which the LEC 152 is an end-point, and displays representations of these calls and associated nodes. The Call View 150 also displays icons representing other nodes that comprise end-points of the calls 154. The LEC 152 is accordingly shown to have calls 154 established to LEC 156 (resident of switch 134), LES 158 and BUS 160 at the time of generation of the Call View 150. The Call View 150 is a snapshot view of the calls 154 at a given moment. It will be appreciated that the parallel MIB gathering methodology described above is useful in gathering information for the Call View 150.

Expanding the Call View

Figure 10A:
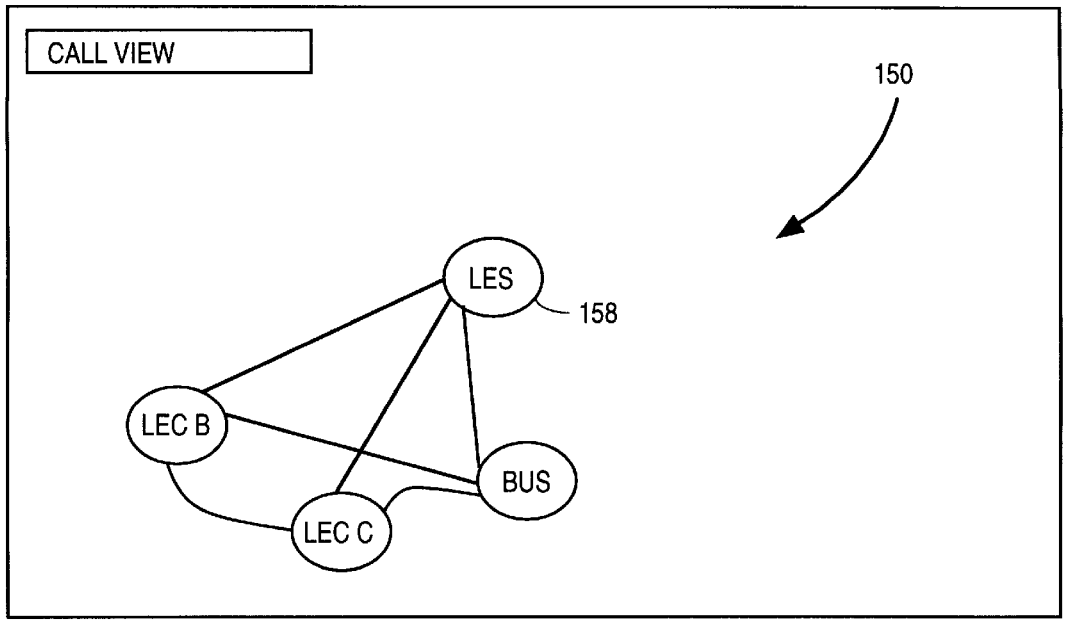
FIGS. 10a and 10b are each examples of a Call View, and illustrate the expansion of a Call View to include further nodes, according to one embodiment of the present invention.
Figure 10B:
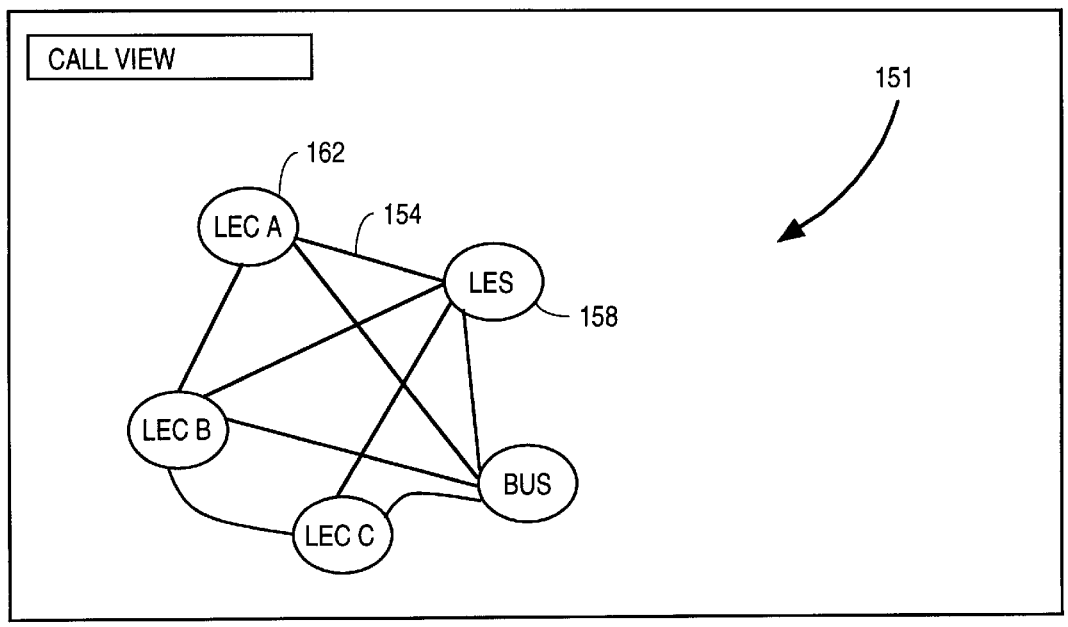

Having generated the Call View 150, a user may wish to perform certain others diagnostic operations using the Call View 150. For example, a user may wish to view all calls for which any one of the nodes represented in the Call View 150 is an end-point. As nodes 152, 156, 158 and 160 are in the scope of the Call View display 150, the front-end 42 will have information about all calls from these nodes to other entities, as a result of previous MIB gathering operations. If a user, for example, selects the LES node 158 for expansion (i.e. to view all calls for which LES 158 is an end-point), the front-end 42 has information about these calls, and can thus display the new calls. Accordingly, by selecting the LES node 158, a user is able to expand the Call View 150 to display all calls for which the LES 158 is an end-point, and also to display all other nodes that comprise end-points of such calls. This expansion operation is illustrated in FIGS. 10a and 10b. Specifically, the LEC 162, which is resident on the switch 132, is displayed in the expanded Call View 151. When the user selects LES 158, the front-end 42 will discover that a node is "unknown" (i.e., the front-end 42 will recognize the existence of a node at end of call 164, but will be unable to identify this node as a LEC). The front end 42 will then call the back-end 46 to identify such an "unknown" node. If the user selects LEC 162 for expansion, the front-end 42 will call the back-end 46 to perform the expansion operation, which may conveniently be termed an "Expand by Hops" operation. Specifically, the front-end 42 will supply the back-end 46 with an ATM address identifying the node selected for expansion, which the back-end 46 is able to map to an IP address utilizing the prefix cache 47. Knowing the IP address of the switch on which the selected node resides, the back-end 46 will then perform a SNMP operation to obtain type and other information concerning the LEC 162, as well as information concerning all calls for which that node is an end-point, from the relevant switch. A consolidated list of nodes and calls connected to the LEC 162 is then propagated from the back-end 46 to the front-end 42, as described with reference to FIGS. 3–6. The front-end 42 will then add all calls to and from the LEC 162 to the Call View 151, as is shown in FIG. 10b. It will be appreciated that more than a single node can be selected for such an expansion operation, in which case of the back-end 46 will retrieve information for multiple nodes from appropriate agents 15 in the manner described above.

Figure 11:
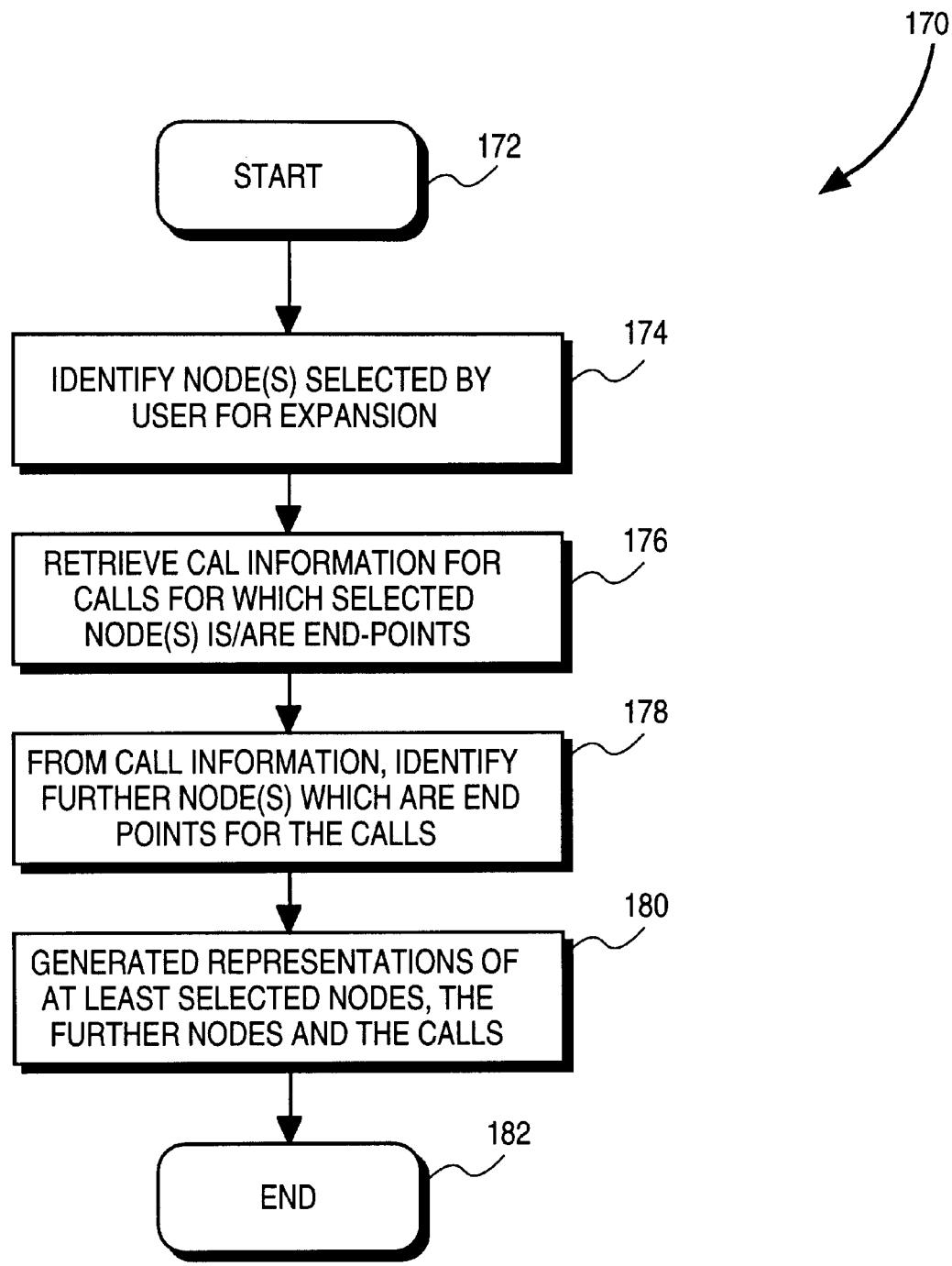
FIG. 11 is a flowchart illustrating a method, according to one embodiment of the present invention, of expanding a Call View to display additional nodes and calls.

Referring now to FIG. 11, there is shown a flowchart illustrating a high-level view of an expansion operation method 170 as shown in FIGS. 10a and 10b. The method 170 commences at step 172, and then proceeds to step 174, where the front-end 42 identifies a node, or group of nodes, selected by a user for expansion. At step 176, the front-end 42 identifies the selected nodes to the back-end 46, which retrieves call information for all calls for which each selected node is an end-point. The back-end 46 also identifies further nodes that are end-points of calls identified in the newly retrieved call information and which may accordingly be just outside the scope of the Call View. The back-end 46 then consolidates the list of nodes and calls into a consolidated list, which is propagated to the front-end 42. At step 180, the front-end 42 generates representations of previously selected nodes, as well as the further nodes that have now been added to the Call View as a result of the expansion operation.

Figure 12:
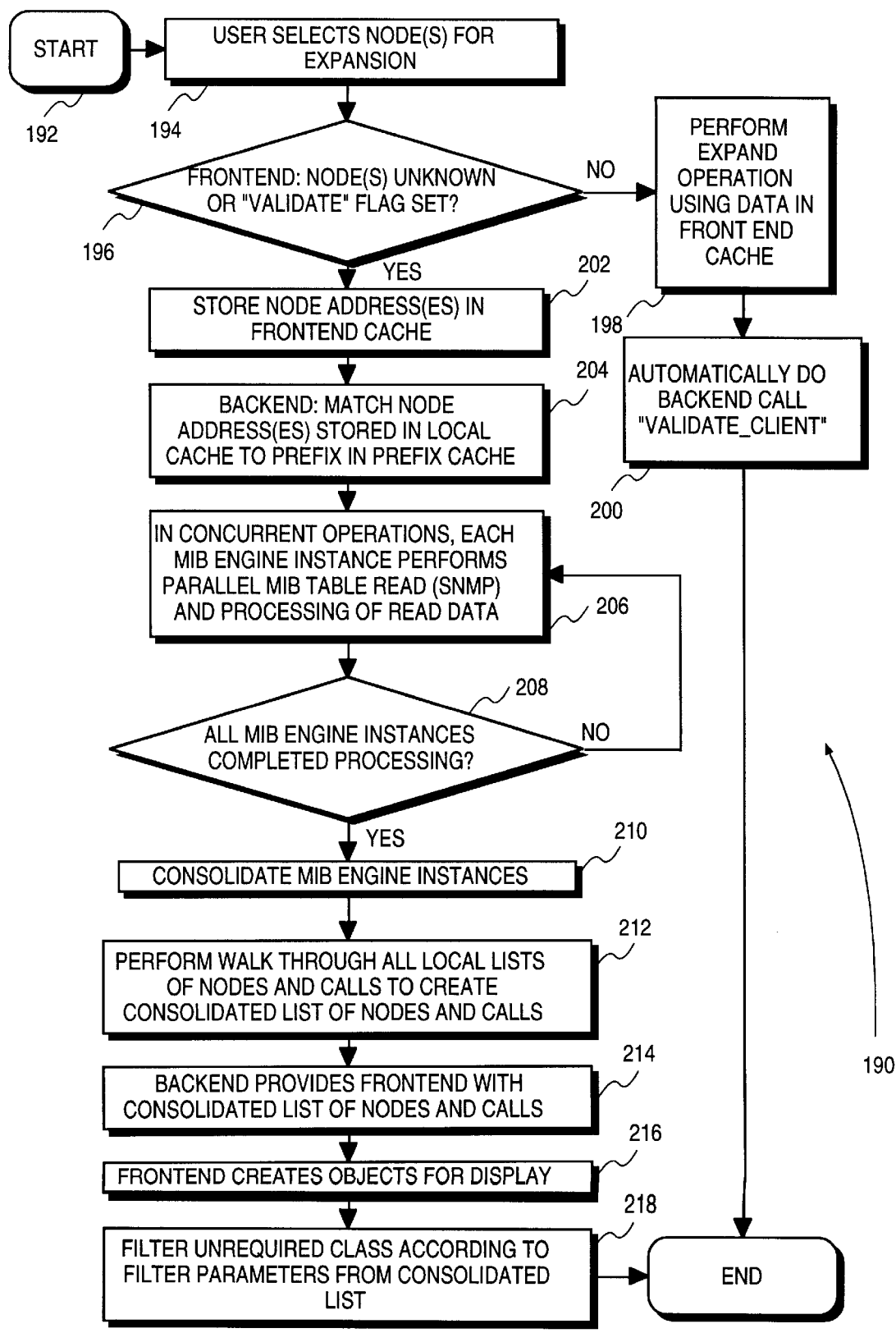
FIG. 12 is a flowchart illustrating in more detail a method, according to one embodiment of the present invention, of expanding a Call View to display additional nodes and calls.

FIG. 12 shows a flowchart illustrating a more detailed method 190 of performing the expansion operation of FIGS. 10a and 10b. The method 190 commences at step 192, whereafter the user selects a node or group of nodes for expansion at step 194. At decision box 196, the front-end 42 determines whether the selected nodes, on which the expansion operation is being done, are unknown, or have set "validate" flags associated therewith.

If it is determined at decision box 196 that there are no selected nodes that are unknown, or selected nodes have a set "validate" flag associated therewith, the method 190 proceeds to step 198, where the expansion operation is performed using information that is currently available in the front-end local cache 41. At step 200, the front-end 42 issues a "validate_client" call to the back-end 46 for any selected nodes having a set "validate_client" flag associated therewith. In response to this call, the back-end 46 performs a MIB gathering operation to determine only limited information regarding selected nodes, as required. For example, the back-end 46 will ascertain the node type, which is then communicated back to the front-end 42. This allows the front-end 42 to provide an icon indicating the node type for each displayed node.

On other hand, if it is determined at decision box 196 that there exist nodes which are unknown, the method 190 proceeds to step 202, and the front-end 42 stores the ATM addresses of the selected nodes in the front-end local cache. At step 204, the back-end 46 identifies IP addresses for relevant agents 15 on the switches where the selected nodes are resident. This is done by mapping prefixes of the ATM addresses of the selected nodes to IP addresses using the prefix cache 47 maintained by the back-end 46. The back-end 46, in a series of concurrent operations, performs parallel MIB table reads by generating a MIB engine instance 46b for each network device on which the selected nodes reside. This MIB gathering operation is performed using SNMP. At decision box 208, a determination is made as to whether all of the MIB engine instances 46b have completed their respective data collection operations. If so, the method 190 proceeds to step 210, where the consolidator 46 consolidates the various local lists generated by the various MIB engines instances 46b. At step 212, the back-end 46 performs a walk through of all of the local lists of calls and nodes to create the consolidated nodes and calls for display. At step 214, the back-end 46 provides the front-end 42 the consolidated list of nodes and calls. At step 216, the front-end creates objects for display.

At step 218, the front-end 42 may optionally filter calls from the consolidated list according to predetermined parameters. These parameters may be a user specified. Specifically, the user may specify that calls of a certain type be removed from the consolidated list. For example, a user may specify that calls which comprise data connections not be displayed when the user is performing a network analysis of control connections. Other filter parameters which could be used include point-to-point/point-to-multipoint characteristics, and PVC and SVC characteristics. The above described methodologies of expanding the Call View display (the "Expand by Hops" methodologies) are advantageous for a number of reasons. Firstly, data is only retrieved from a limited number of network devices. Accordingly only a limited number of read operations are required, and the time required to expand the Call View is reduced. Secondly, the above-described methodologies did not require the maintenance of a database reflecting the state of the entire network, as information is retrieved only to the extent needed and in a real-time manner. The methodologies facilitate a user display using which a network manager can view information pertinent to a specific analysis, and which allows incremental exploration of calls that exist between selected nodes. The exploration is further based on logical (as opposed to physical) criteria, as virtual connections are logical connections and may traverse any number of physical devices and links between network devices. This is advantageous as the display of a physical route over which a virtual connection is established may be difficult in view of the large number of devices and links that may constitute the physical path.

Displaying Changes in Call Status

Figure 13A:
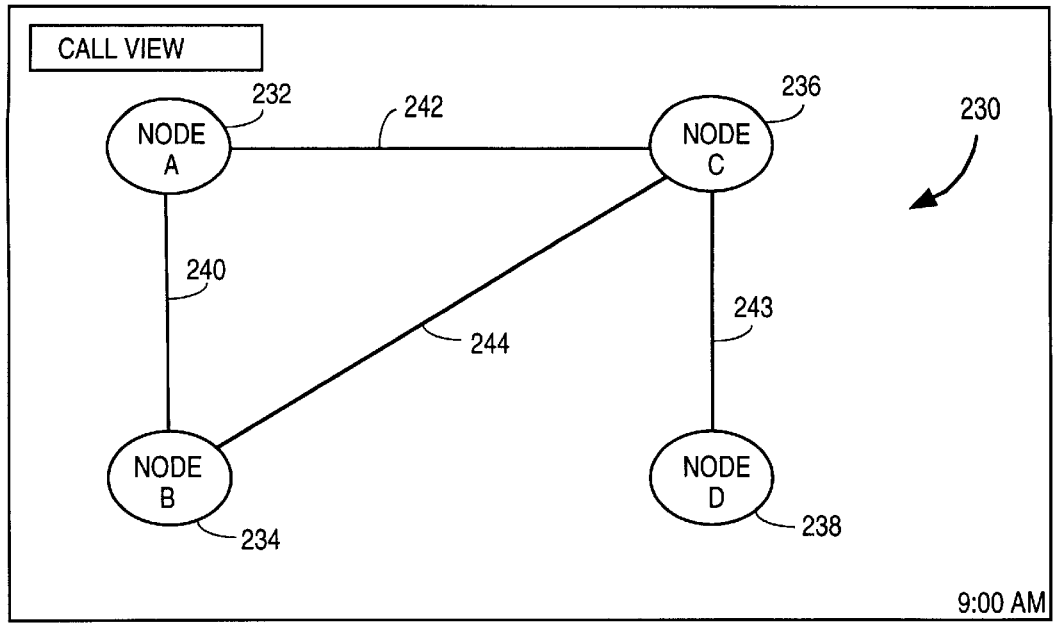
FIGS. 13a and 13b are examples of Call Views showing representations of changes in call status between the nodes of the Call View over a time period, according to one embodiment of the present invention.
Figure 13B:
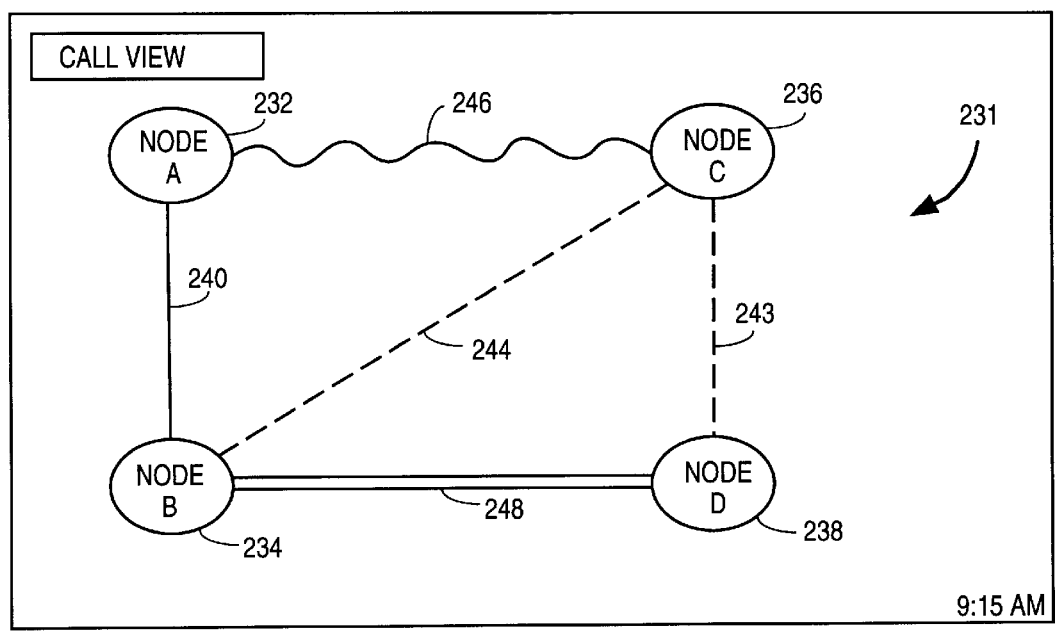

As described above all, the nature of calls within a connection-oriented network is typically transient and dynamic. It is useful to a network manager to be able to view and analyze changes in call status between nodes, as such changes can provide valuable information regarding potential problems within the network. Referring now to FIGS. 13a and 13b, FIG. 13a illustrates a Call View display 230 as determined at a first time instance (e.g. 9:00 am) and in which four nodes 232, 234, 236 and 238 are shown to be within the scope of the display. A number of calls 240, 242, 243 and 244 are shown to exist between the nodes at the first time instance. FIG. 13b illustrates a Call View display 231 as determined at a second time instance (e.g. 9:15 a.m.) in which the same four nodes are displayed. However, at the second time instance, the status of the calls between the various nodes has changed, and these changes in status are identified in the Call View 231. According to one embodiment of the invention, four status change indicators can be displayed. Specifically, a call status can be indicated as being:

1. CALL_NOW_NONE_BEFORE (i.e. a new call);
2. CALL_BEFORE_NONE_NOW (i.e. a removed call);
3. CALL_NOW_SAME_BEFORE (i.e. the call status is unchanged); and
4. CALL_NOW_DIFF_BEFORE (i.e. a replacement call).

It will be appreciated that a large variety of indicators can be provided to indicate a change in the status of a call. In the exemplary embodiment, the status of call 240 has remained unchanged from the first time instances to the second time instance. Accordingly, the representation of this call is unchanged. However, the call 242 has been replaced by a new call 246, and the status of this new call is indicated by the representation of the line between the nodes 232 to 236. The calls 244 and 243 have been removed, or torn down, between the first time instance and the second time instance. Accordingly, the absence of these calls at the second time instance is indicated in broken line. Similarly, a new call 248 has been established between nodes 234 and 238, this new call 248 being represented by a double line. It will be appreciated that the above examples of indications of the changes in the status are merely exemplary, and changes in status could be equally well represented by any graphical means. For example, a coloring of the lines representing calls between the nodes in different ways could represent changes in status.

Figure 14:
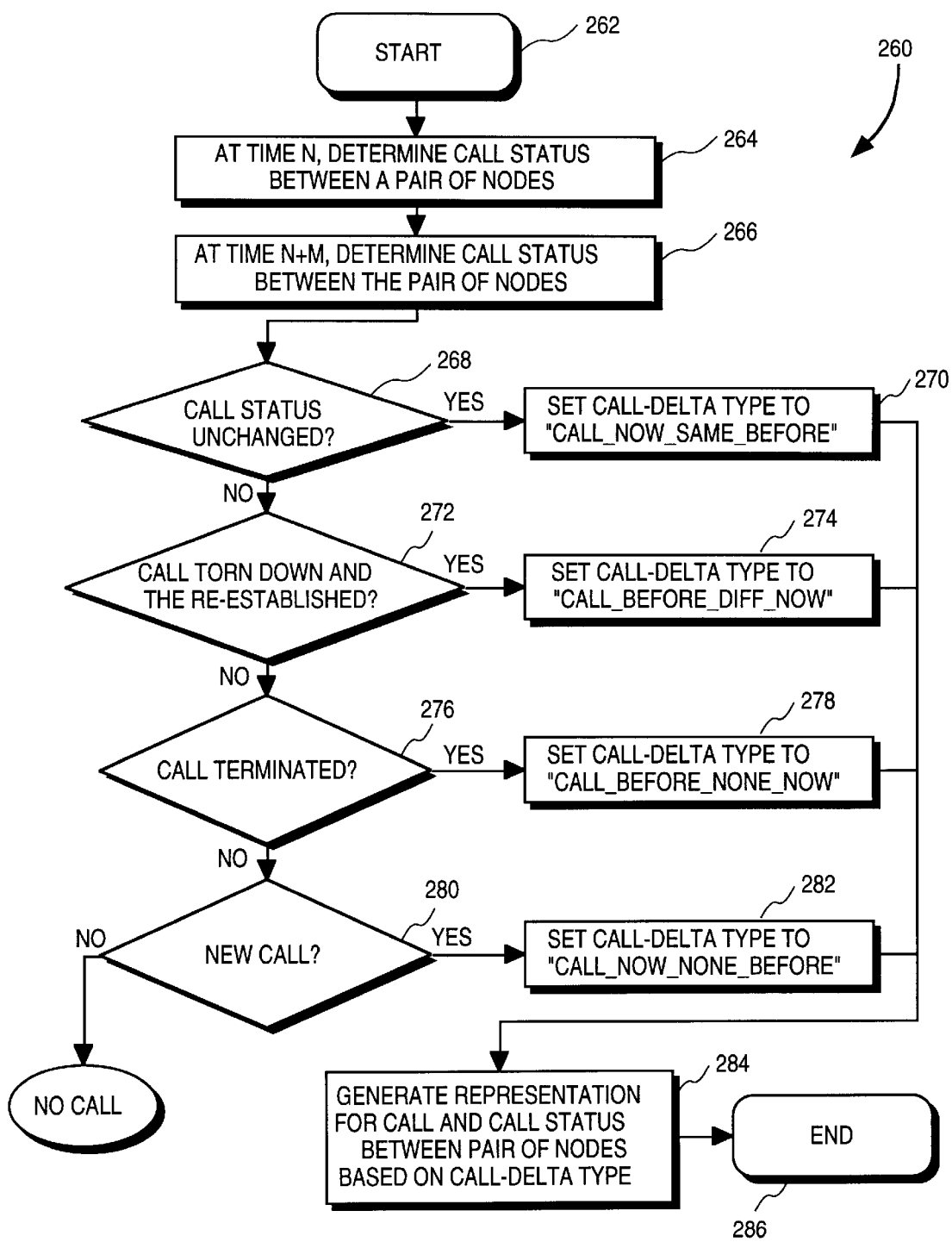
FIG. 14 is a flowchart illustrating a method, according to one embodiment of the invention, of determining and displaying changes in call status between a pair of nodes in a connection-oriented network.

FIG. 14 shows a flowchart illustrating a method 260 of displaying changes in call status between two nodes over a time period defined by two time instances. The method 260 commences at step 262 and proceeds to step 264, where a determination is made at time N of the call status between a pair of the nodes. At step 266, and at time N+M, a further determination is made of the call status between the same pair of nodes. In one embodiment of the present invention, the status of a call is determined by the back-end 46, which examines the MIB tables 48 discussed above, and extracts at least VPI, VCI, ifIndex and call node ATM address information therefrom, which information identifies the call. By comparing this information obtained at different time instances, the back-end 46 is able to determine whether the call status between two nodes between the different time instances.

The method proceeds from step 266 to a decision box 268, where a determination is made as to whether the call status between the subject nodes has remain unchanged. If so, the back-end 46 sets a call delta type variable to a CALL_NOW_SAME_BEFORE value. If not, the method 260 proceeds to decision box 272, where a determination is made as to whether a call between the two subject nodes has been torn down, and whether a new call has been established between the subject nodes. If so, the back-end 46 sets the call delta type variable to a CALL_NOW_DIFF_BEFORE value at step 274. If not, the method 260 proceeds to the decision box 276, where a determination is made at to whether a call between the subject nodes has been terminated. If so, the back-end 46 sets the a call delta type variable to a CALL_BEFORE_NONE_NOW value at the step 278. If not, the method 260 proceeds to decision box 280, where a determination is made as to whether a new call has been established between the subject nodes. If so, the method proceeds to step 282, where the back-end 46 sets the call delta type variable to a CALL_NOW_NONE_BEFORE value.

The call delta type variable is included in the consolidated list of nodes and calls propagated from the back-end 46 to the front-end 42 and accordingly, at step 284, the front-end 42 is able to generate representations of calls within a network in a manner which represents any change in the status of such calls which may have occurred between time N and time N+M. The method then terminates at step 286.

Figure 15:
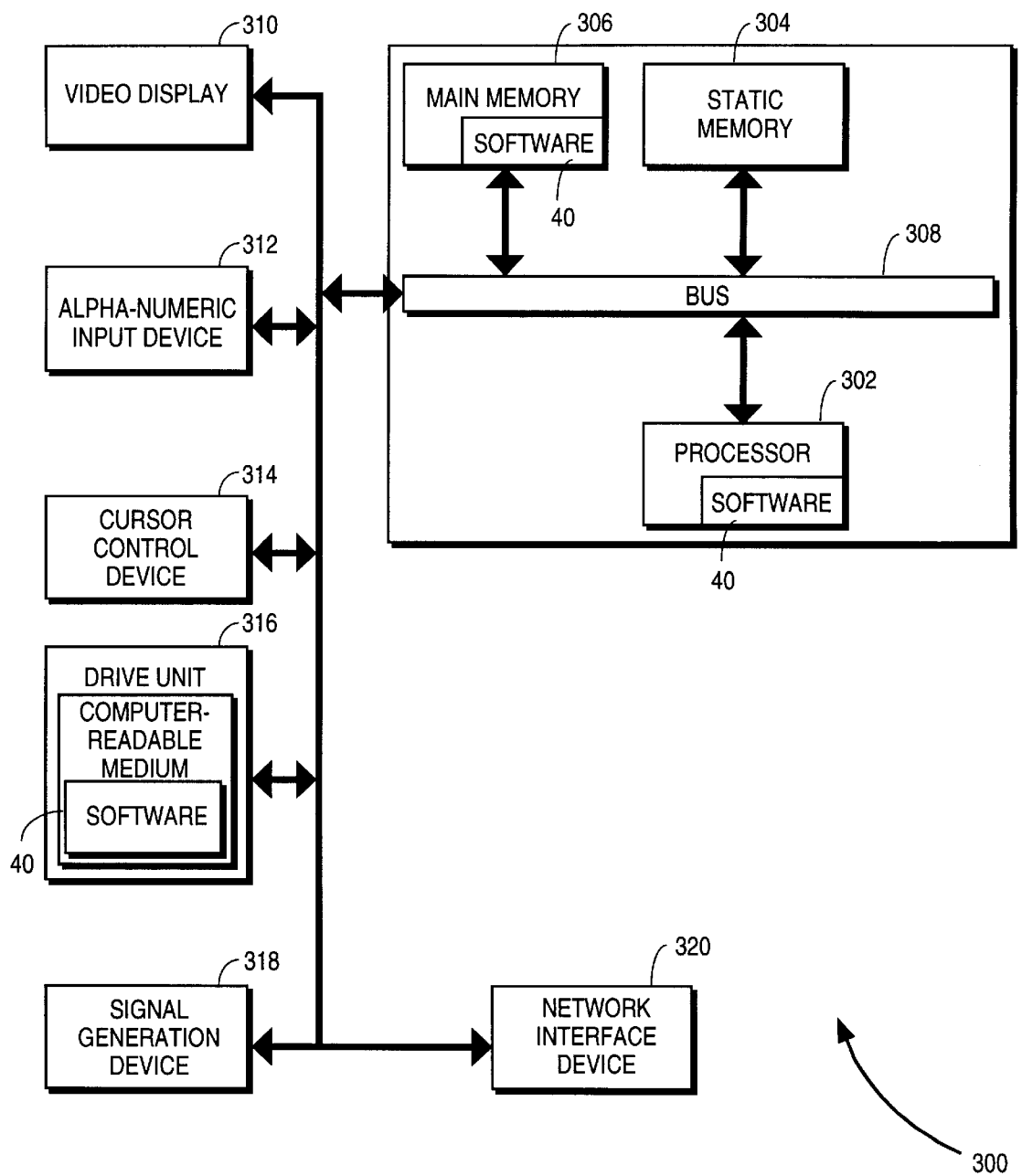
FIG. 15 is a diagrammatic representation of a computer system which may operate as a network management station, or may comprise a network device, and which includes a computer-readable medium on which is stored a sequence of instruction which cause the computer system to perform any one of the inventive methodologies disclosed in this specification.

FIG. 15 is a schematic representation of a computer system 300, which may operate as a network management station, or which may be incorporated within any network device, such as a switch or router, for the purposes of performing network management. The computer system 300 includes a processor 302, a static memory 304 and a main memory 306. The memories 304 and 306 are in communication with the processor 302, and also with a number of peripheral devices that may optionally be included in the computer system 300, via a bus 308. The peripheral devices that may be included in the computer system 300 include a video display 310 upon which the various views of a network, as described above, may be displayed. Such a video display 310 may, for example, comprise a Cathode Ray Tube (CRT) or a Liquid Crystal Display (LCD). Other peripheral devices may included an alpha-numeric input device 312 (such as keyboard), a cursor control device 314 (such as a mouse), a disk drive unit 316, a signal generation device 318 (such as a speaker) and a network interface device 320.

The network management software 40 is shown in FIG. 15 to reside on a computer-readable medium, such as a magnetic disk, within the disk drive unit 316. Network management software 40 may also reside, at least in part, in the static or main memories, or in the processor, of the computer system 300. The network interface device 320 is capable of transmitting and receiving a carrier wave signal, which encodes the network management software 40. Specifically, the network management software 40 shown in FIG. 15, comprises a sequence of instructions which, when executed by the processor 302, cause the computer system 300 to perform the steps of any of the methodologies described above in this specification.

In alternative embodiments, the present invention may be applicable to implementations of the invention in integrated circuits or chip sets, wireless implementations, switching systems products and transmission systems products. For the purposes of this application, the terms switching systems products shall be taken to mean private branch exchanges (PBXs), central office switching systems that interconnected subscribers, toll/tandem switching systems for interconnecting trunks between switching centers, and broadband core switches found at the center of a service provider's network that may be fed by broadband edge switches or access MUXes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Thus, a method of gathering information pertaining to calls between nodes in a connection-oriented network has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of identifying calls between nodes within a connection-oriented network, the method comprising:

identifying first and second network devices within the connection-oriented network;

in concurrent first and second operations, retrieving network management information from the first and second network devices respectively; and processing the network management information to identify nodes and calls in the connection-oriented network.

2. The method of claim 1 wherein processing the network management information comprises identifying a first set of nodes that are resident on either the first or second network device, calls for which the nodes within the first set are end-points, and a second set of nodes which are end-points of the identified calls but are not resident on the first or second network devices.

3. The method of claim 1 wherein the network management information is retrieved in response to a user input which identifies the first and second network devices.

4. The method of claim 1 wherein each of the concurrent first and second operations comprises interrogating a network management agent associated with the respective first or second network device.

5. The method of claim 1 wherein each of the concurrent first and second operations comprises a read operation of MIB tables associated with the respective first or second network device.

6. The method of claim 1 wherein the connection-oriented network is an Asynchronous Transfer Mode (ATM) network, and the network management information includes a Virtual Channel Identifier.

7. The method of claim 6 wherein the network management information includes a Virtual Path Identifier.

8. The method of claim 1 wherein retrieving network management information comprises generating a dedicated information gathering engine instance for each of the respective first and second network devices.

9. The method of claim 1 wherein processing the network management information includes identifying logical connections for which the identified nodes are end-points.

10. The method of claim 9 including displaying respective graphical representations of the identified nodes, and of the logical connections for which the identified nodes are end-points.

11. The method of claim 1 including correlating the network management information retrieved in the first and second operations to identify nodes within the connection-oriented network that are in communication with each other via the identified calls.

12. A machine-readable medium having a sequence of instructions stored thereon which, when executed by a machine, cause the machine to perform the steps of:

identifying first and second nodes within a connection-oriented network;

in concurrent first and second operations, retrieving network management information relating to the first and second nodes respectively; and processing the network management information relating the first and second nodes to identify calls within the connection-oriented network for which the first and second nodes are end-points.

13. A carrier wave encoding a sequence of instructions which, when executed by a machine, cause the machine to perform the steps of:

identifying first and second nodes within a connection-oriented network;

in concurrent first and second operations, retrieving network management information relating to the first and second nodes respectively; and processing the network management information relating to the first and second nodes to identify calls within the connection-oriented network for which the first and second nodes are end-points.

14. A network management application for identifying calls between nodes within a network, the application comprising:

a first engine and a second engine to concurrently retrieve network management information from a first network device and a second network device, respectively; and a consolidator to process and consolidate the network management information retrieved from the first and second network devices.

15. The network management application of claim 14 wherein the consolidator identifies nodes and calls in the network based upon the network management information retrieved from the first and second network devices.

16. The network management application of claim 15 wherein the consolidator generates a consolidated list of nodes and calls in the network that are identified based upon the network management information retrieved from the first and second network devices.

17. A network manager comprising:

first and second means for concurrently retrieving network management information from first and second network devices in a network, respectively; and third means for processing and consolidating the network management information retrieved from the first and second network devices.

18. The network manager of claim 17 wherein the processing and consolidating of the network management information comprise identifying nodes and calls in the network.

19. The network manager of claim 18 wherein the processing and consolidating of the network management information comprise generating a consolidated list of nodes and calls in the network.

* * * * *